US008379581B2

(12) United States Patent
Imamura

(10) Patent No.: US 8,379,581 B2
(45) Date of Patent: Feb. 19, 2013

(54) SYSTEMS AND METHODS FOR UPLINK POWER CONTROL

(75) Inventor: Kimihiko Imamura, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 760 days.

(21) Appl. No.: 12/330,313

(22) Filed: Dec. 8, 2008

(65) Prior Publication Data

US 2010/0142455 A1 Jun. 10, 2010

(51) Int. Cl.

*H04B 7/00* (2006.01)
*H04B 7/185* (2006.01)
*H04W 4/00* (2009.01)

(52) U.S. Cl. ........ 370/329; 370/207; 370/318; 370/344; 455/522

(58) Field of Classification Search .......... 370/208–469; 375/267, 260; 455/101–522, 550.1
See application file for complete search history.

(56) References Cited

U.S. PATENT DOCUMENTS

| | | | | |
|---|---|---|---|---|
| 2006/0003787 | A1 | 1/2006 | Heo et al. | |
| 2007/0291634 | A1* | 12/2007 | Kwon et al. | 370/208 |
| 2008/0102879 | A1* | 5/2008 | Heo et al. | 455/522 |
| 2010/0118991 | A1* | 5/2010 | Lee et al. | 375/260 |
| 2010/0142457 | A1* | 6/2010 | Chun et al. | 370/329 |
| 2010/0220683 | A1* | 9/2010 | Novak et al. | 370/330 |
| 2011/0007673 | A1* | 1/2011 | Ahn et al. | 370/280 |
| 2011/0142000 | A1* | 6/2011 | Han et al. | 370/329 |

FOREIGN PATENT DOCUMENTS

| | | |
|---|---|---|
| EP | 1 605 605 | 12/2005 |
| EP | 1814236 | 8/2007 |
| JP | 2006-014304 | 1/2006 |
| WO | 2008/102829 | 8/2008 |

OTHER PUBLICATIONS

NTT DoCoMo, “Proposals for LTE-Advanced Technologies,” REV-080026, Apr. 2008.
Samsung, “Future 3GPP Radio Technologies for IMT-Advanced,” REV-080037, Apr. 2008.
NEC Corporation, “NEC’s proposals for LTE Advanced,” REV-080022, Apr. 2008.
Nokia Siemens Networks, Nokia, “LTE-A Requirements,” R1-081842, May 2008.
Ericsson, “Physical-layer parameters to be configured by RRC,” R1-081645, Apr. 2008.
3GPP TS36.212 v8.2.0 section 5.3.3, “Technical Specification Group Radio Access Network; Evolved Universal Terrestrial Radio Access (E-UTRA); Multiplexing and channel coding (Release 8),” Mar. 2008.
Ericsson, “PDCCH contents,” R1-081525, Apr. 2008.
3GPP TS 36.213 V8.3.0 section 5.1.1, “Technical Specification Group Radio Access Network; Evolved Universal Terrestrial Radio Access (E-UTRA); Physical layer procedures (Release 8),” May 2008.

(Continued)

*Primary Examiner* — Afsar M. Qureshi
(74) *Attorney, Agent, or Firm* — Austin Rapp & Hardman

(57) ABSTRACT

A method for uplink power control is described. A user equipment (UE) power class may be determined. An uplink multiple access scheme may also be determined. The maximum transmission power for the UE may further be determined according to the determined uplink multiple access scheme and the UE power class.

66 Claims, 15 Drawing Sheets

OTHER PUBLICATIONS

LG Electronics, "Uplink Multiple Access Schemes for LTE-A," R1-083658, Oct. 2008.

3GPP TS 36.213 V8.4.0, "Evolved Universal Terrestrial Radio Access (E-UTRA) Physical layer procedures (Release 8)," Sep. 2008.

3GPP TS 25.101 V8.4.0, "User Equipment (UE) Radio Transmission and Reception (FDD) (Release 8)," Sep. 2008.

International Search Report issued for International Patent Application No. PCT/US2009/070444 on Jan. 12, 2010.

* cited by examiner

600

PUSCH Transmit Power Calculation Module 340

- $P_{MAX}$ 802
- $\Delta_{ULMA}$-SC-FDMA 804
- $\Delta_{ULMA}$-NxSC-FDMA 806
- $\Delta_{ULMA}$-OFDMA 808
- $\Delta_{ULMA}$-Clustered SC-FDMA 810
- $\Delta_{ULMA}$ 812
- $M_{PUSCH}$ 814
- $P_{oPUSCH}$ 816
- $\alpha$ 818
- PL 820
- $\Delta_{TF}$ 822
- $K_s$ 824
- MPR 826
- TBS 828
- $N_{RE}$ 830
- $N_{sc}^{RB}$ 832
- $N_{symb}^{UL}$ 834
- $P_{O\_NOMINAL\_PUSCH}(j)$ 836
- $P_{O\_UE\_PUSCH}(j)$ 838
- $\delta_{PUSCH}$ 840
- $K_{PUSCH}$ 842
- $P_{PACap}$ 844
- $f(i)$ 846

SYSTEMS AND METHODS FOR UPLINK POWER CONTROL

TECHNICAL FIELD

The present disclosure relates generally to communications and wireless communications systems. More specifically, the present disclosure relates to systems and methods for uplink power control.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality.

A wireless communication device may be referred to as user equipment, a mobile station, a subscriber station, an access terminal, a remote station, a user terminal, a terminal, a subscriber unit, etc. The term "user equipment" (UE) will be used herein.

A wireless communication system may provide communication for a number of cells, each of which may be serviced by an eNodeB. An eNodeB may be a fixed station that communicates with UEs. An eNodeB may alternatively be referred to as a base station, an access point, or some other terminology. The term "eNodeB" will be used herein.

UEs may communicate with one or more eNodeBs via transmissions on the uplink and the downlink. The uplink (or reverse link) refers to the communication link from the UEs to the eNodeB, and the downlink (or forward link) refers to the communication link from the eNodeB to the UEs. A wireless communication system may simultaneously support communication for multiple UEs.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, single carrier frequency division multiple access (SC-FDMA) systems, clustered SC-FDMA, NxSC-FDMA (a natural number N times single carrier frequency division multiple access), and orthogonal frequency division multiple access (OFDMA) systems.

The 3rd Generation Partnership Project, also referred to as "3GPP," is a collaboration agreement that aims to define globally applicable Technical Specifications and Technical Reports for 3rd Generation Systems. 3GPP Long Term Evolution (LTE) is the name given to a project to improve the Universal Mobile Telecommunications System (UMTS) mobile phone or device standard to cope with future requirements. 3GPP LTE-Advanced is an enhancement of the 3GPP LTE standard. The 3GPP may define specifications for the next generation mobile networks, systems, and devices. In one aspect, UMTS has been modified to provide support and specification for the Evolved Universal Terrestrial Radio Access (E-UTRA) and Evolved Universal Terrestrial Radio Access Network (E-UTRAN).

DETAILED DESCRIPTION

Figure 1:
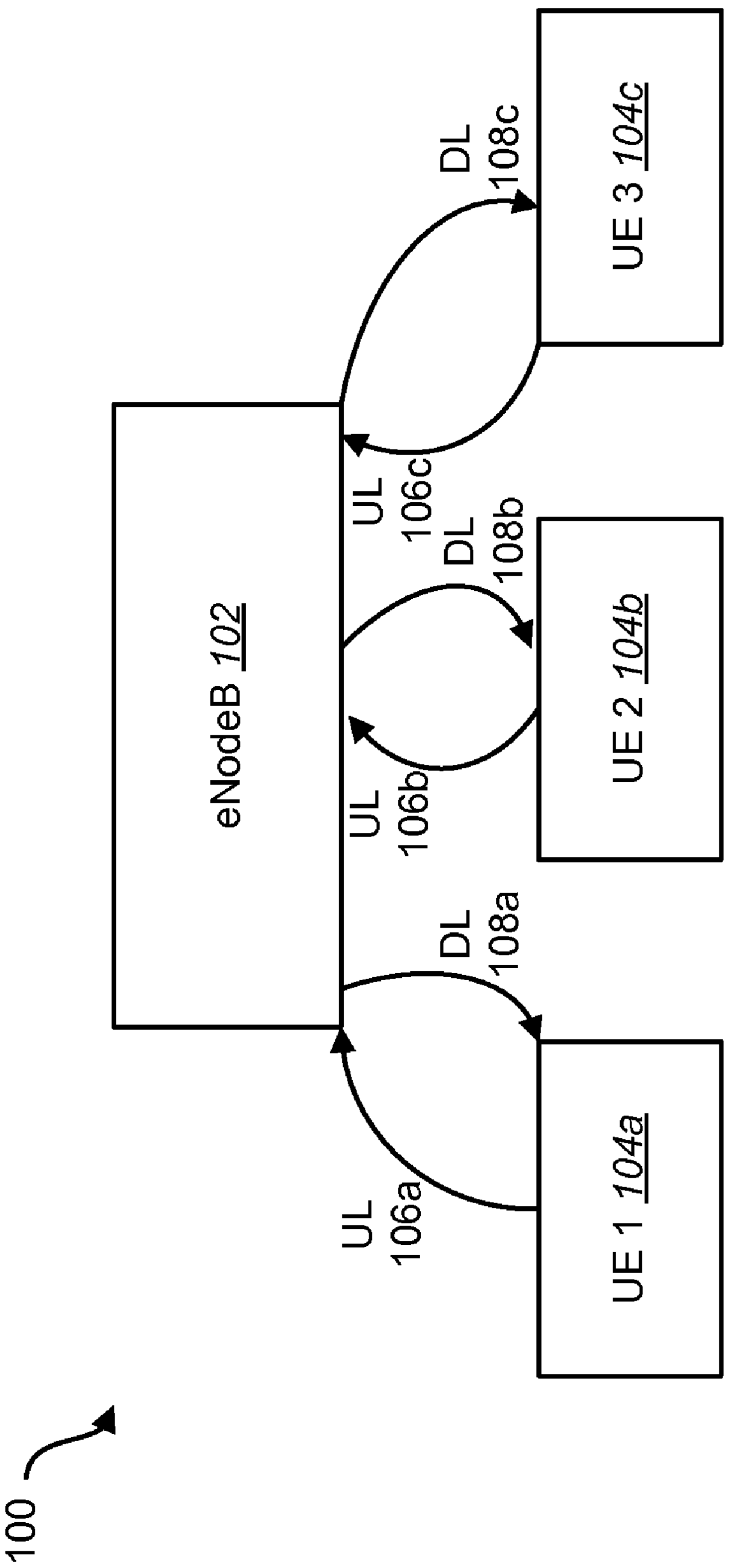
FIG. 1 illustrates a wireless communication system in which the present systems and methods may be practiced.

A method for uplink power control is disclosed. A user equipment (UE) power class is determined. An uplink multiple access scheme is determined. The maximum transmission power is determined for the UE according to the determined uplink multiple access scheme and the UE power class.

The value for an uplink maximum transmission power limiting factor may be determined according to the determined uplink multiple access scheme. The uplink maximum transmission power limiting factor may be an uplink multiple access scheme dependent value used by the UE to limit the maximum transmission power for the UE.

The maximum transmission power for the UE may be a function of the UE power class and the uplink maximum transmission power limiting factor. The maximum transmission power for the UE may be a function of the UE power class, the uplink maximum transmission power limiting factor, and the power amplification (PA) capacity for each power amplifier of the UE.

The physical uplink shared channel (PUSCH) transmission power may be determined using the maximum transmission power. Uplink signals may be transmitted according to the selected uplink multiple access scheme using the determined transmission power for the PUSCH.

The uplink multiple access scheme may be single carrier frequency division multiple access (SC-FDMA). Additionally, the uplink multiple access scheme may be orthogonal frequency division multiple access (OFDMA). Moreover, the uplink multiple access scheme may be N (N is a natural number) times single carrier frequency division multiple access (N×SC-FDMA) or clustered single carrier frequency division multiple access (Clustered SC-FDMA).

Downlink control information (DCI) may be received. A format of the DCI may be decoded. The uplink multiple access scheme may be determined according to the format of the DCI. Decoding the format of the DCI may include determining if the DCI format includes a resource block (RB) allocation format that only allows contiguous RB allocation, determining if the DCI format includes a non-contiguous resource block (RB) allocation, or determining if the DCI format includes a precoding matrix index (PMI).

The UE may be configured for operation in a 3GPP LTE-Advanced system. The uplink multiple access scheme may be orthogonal frequency division multiple access (OFDMA) or clustered single carrier frequency division multiple access (Clustered SC-FDMA) or N (N is a natural number) times single carrier frequency division multiple access (N×SC-FDMA) if the DCI format includes a precoding matrix index (PMI) and/or a non-contiguous resource block (RB) allocation format. The uplink multiple access scheme may be single carrier frequency division multiple access (SC-FDMA) if the DCI format does not include a PMI or a non-contiguous RB allocation format.

The UE may be configured for operation in a 3GPP LTE-Advanced system. The uplink multiple access scheme may be orthogonal frequency division multiple access (OFDMA) or clustered single carrier frequency division multiple access (Clustered SC-FDMA) or N (N is a natural number) times single carrier frequency division multiple access (N×SC-FDMA) if the DCI format includes a non-contiguous resource block (RB) allocation. The uplink multiple access scheme may be single carrier frequency division multiple access (SC-FDMA) if the DCI format includes a contiguous RB allocation.

Determining the uplink multiple access scheme may comprise comparing the DCI format to an uplink data transmission table.

The method may be carried out by a UE using L1/L2 signaling.

The power amplifier (PA) capacity may be sent to an eNodeB. The PA capacity may be an internal parameter for each UE that defines the total transmission power of the UE.

The value of the uplink maximum transmission power limiting factor may be 1.6 for clustered single carrier frequency division multiple access (Clustered SC-FDMA). The value of the uplink maximum transmission power limiting factor may be 2.0 for N (N is a natural number) times single carrier frequency division multiple access (N×SC-FDMA). For orthogonal frequency division multiple access (OFDMA), the value of the uplink maximum transmission power limiting factor may be 2.4. The value of the uplink maximum transmission power limiting factor may be 0 for single carrier frequency division multiple access (SC-FDMA). The value of the uplink maximum transmission power limiting factor may be less than 4 dB.

A user equipment (UE) that is configured for uplink power control is disclosed. The user equipment includes a processor and memory in electronic communication with the processor. Executable instructions are stored in the memory. The UE power class is determined. An uplink multiple access scheme is determined. The maximum transmission power for the UE is determined according to the determined uplink multiple access scheme and the UE power class.

A base station that is configured for uplink power control in a wireless communications system is disclosed. The base station includes a processor and memory in electronic communication with the processor. Executable instructions are stored in the memory. A location of a user equipment (UE) is determined. The UE power class is determined. An uplink multiple access scheme is determined to be used by the UE. A format is selected for downlink control information (DCI). The format of the DCI corresponds to the uplink multiple access scheme and the UE power class. The DCI is transmitted to the UE.

A computer-readable medium comprising executable instructions is disclosed. A user equipment (UE) power class is determined. An uplink multiple access scheme is determined. The maximum transmission power is determined for the UE according to the determined uplink multiple access scheme and the UE power class.

A method for uplink power control is disclosed. A downlink control indicator (DCI) is received. The number of chunks of resource blocks (RBs) in the DCI format is determined. The value for an uplink maximum transmission power limiting factor is determined according to the number of chunks of RBs. The uplink maximum transmission power limiting factor is an uplink multiple access scheme dependent value used by the UE to limit the maximum transmission power for the UE. An uplink multiple access scheme is determined. The maximum transmission power is determined for the UE according to the determined uplink multiple access scheme and the uplink maximum transmission power limiting factor.

The uplink transmission scheme for a 3GPP LTE system is based on SC-FDMA. In 3GPP LTE-Advanced, OFDMA may be added as an uplink transmission scheme in addition to SC-FDMA. NxSC-FDMA and Clustered SC-FDMA may also be added as additional uplink transmission schemes in LTE-Advanced.

In an OFDMA system, spectrum is partitioned amongst a plurality of users by transmitting each user's information on multiple carriers, called sub-carriers. A data stream to be transmitted is split into multiple lower-rate data streams, and each of these sub-carriers is independently modulated by one of the lower-rate data streams.

Orthogonal frequency division multiple access (OFDMA) allows the access of spectrum by multiple users on the available bandwidth using different orthogonal frequencies to transmit information orthogonally with respect to each other. A system employing OFDMA transmission sends data modulated signals through an IFFT (inverse Fast Fourier Transform) before transmission. Each user may be assigned specific time-frequency resources. The allocation of specific time/frequency resources for transmission of users' data may be via shared channels; i.e., for each transmission time interval, a new scheduling decision may be taken regarding which users are assigned to which time/frequency resources during that transmission time interval. A radio frame is a basic unit of time in which a plurality of transmissions and receptions may occur. A radio frame may be divided into a certain number of equally sized slots. A sub-frame may consist of two consecutive slots. OFDMA systems may have a high peak-to-average power ratio (PAPR).

Communication systems employing single carrier frequency division multiple access (SC-FDMA) also allow the access of multiple users on the available bandwidth by using different orthogonal frequencies to transmit information. However, unlike OFDMA, the transmitters in a communication system employing SC-FDMA include the step of sending the signals through a DFT (discrete Fourier Transform) before the IFFT, thereby reducing the PAPR but increasing the complexity. SC-FDMA also requires additional complexity at the receiver.

Clustered SC-FDMA is very similar to SC-FDMA. In SC-FDMA, the DFT output is mapped to IFFT in such a way that the transmitted spectrum is contiguous. On the other hand, in clustered SC-FDMA, the DFT output is divided into several clusters and mapped to IFFT input. The intervals between these clusters will be filled with zero input. In other words, the intervals between these clusters will be punctured. Clustered SC-FDMA will support non-contiguous frequency allocation by this mechanism.

NxSC-FDMA is also similar to SC-FDMA. To achieve non-contiguous frequency allocation, multiple DFTs will be used in NxSC-FDMA. These outputs will be mapped to the IFFT. The output of the IFFT becomes multiple single carrier signals.

Several different channels are defined for a 3GPP LTE system. For transmission on the downlink, user data is carried on the physical downlink shared channel (PDSCH). Downlink control signaling on the physical downlink control channel (PDCCH) is used to convey the scheduling decisions to individual UEs. The PDCCH is located within the first three OFDMA symbols of a subframe.

Modulation and coding for the shared data channel is not fixed, but is adapted according to radio link quality. The UEs regularly report channel quality indicator (CQI) information to the eNodeB.

For transmission on the uplink, user data is carried on the physical uplink shared channel (PUSCH). The physical uplink control channel (PUCCH) carries uplink control information, e.g., CQI reports and ACK/NACK information related to data packets received in the downlink. The UE uses the PUCCH when it does not have any data to transmit on the PUSCH. If the UE has data to transmit on the PUSCH, the UE multiplexes the control information with data on the PUSCH.

Data is allocated to the UEs in terms of resource blocks (RB). Resource blocks are used to describe the mapping of certain physical channels to resource elements. A physical resource block is defined as a certain number of consecutive OFDMA symbols in the time domain and a certain number of consecutive subcarriers in the frequency domain.

FIG. 1 illustrates a wireless communication system 100 in which the present systems and methods may be practiced. In a communications system 100, transmission signals may be sent from a mobile station to a base station and from a base station to a mobile station. Communications from the mobile station to the base station may be referred to as uplink communications 106. Similarly, communications from the base station to the mobile station may be referred to as downlink communications 108.

The present systems and methods described herein relate to 3GPP LTE Advanced systems. However, the present systems and methods may be utilized for other communication systems such as IEEE 802.16 (WiMAX) systems and other systems where the scheduling of users is applicable.

The base station may be referred to as an evolved eNodeB (eNodeB) 102. The mobile station may be referred to as user equipment (UE) 104. An eNodeB 102 may be in wireless communication with one or more UEs 104 (which may also be referred to as user devices, communications devices, subscriber units, access terminals, terminals, etc.). The eNodeB 102 may be a unit adapted to transmit to and receive data from cells. Although not shown, a wireless communication system 100 may include more than one eNodeB 102 and more than the three UEs 104 shown in FIG. 1.

In one example, the eNodeB 102 handles the communication across a radio interface, covering a specific geographical area in the vicinity of the eNodeB 102, which is referred to as a cell. Depending on sectoring, one or more cells may be served by the eNodeB 102, and accordingly the eNodeB 102 may support one or more UEs 104 depending on where the UEs 104 are located. In one configuration, the eNodeB 102 provides a 3GPP Long Term Evolution (LTE) Advanced air interface and performs radio resource management for the communication system 100.

As discussed above, the eNodeB 102 may be in electronic communication with one or more UEs 104. A first UE 104*a*, a second UE 104*b*, and a third UE 104*c* are shown in FIG. 1. The eNodeB 102 may transmit data to the UEs 104 and receive data from the UEs 104 over a radio frequency (RF) communication channel.

The signals transmitted by a UE 104 may include requests for data. The signals transmitted by the eNodeB 102 may be data requested by a particular UE 104 such as downloaded Internet data. Alternatively, the signals transmitted by the eNodeB 102 and UEs 104 may include data for maintaining the wireless communication system 100. For example, the eNodeB 102 may transmit reference signals to the UEs 104 requesting channel estimation, and the UEs 104 may return channel estimation values to the eNodeB 102. Examples of possible reference signals include pilots or beacons which may be single tone signals with a known amplitude and frequency. Another example may be a reference signal used in current LTE systems, which is a known (by transmitter and receiver) sequence of symbols used for estimating the channel. A further example of a reference signal may be Zadoff-Chu sequences as described in 3GPP TS 36.211 V8.2.0 (2008-03).

The eNodeB 102 may also transmit control information to the UEs 104. The control information may include instructions for the uplink multiple access scheme to be used by a UE 104. For example, the eNodeB 102 may transmit control information to a UE 104 that instructs the UE 104 to transmit uplink information using OFDMA, SC-FDMA, clustered SC-FDMA, or NxSC-FDMA.

A scheduler on the eNodeB 102 may determine the service parameters, such as the coding and modulation scheme of a UE 104 before it is served. The scheduler may assign one or more UEs 104 to each communication channel. To perform this task, the eNodeB 102 may use channel quality information of all the UEs 104 over at least a portion of the frequency band.

Figure 2:
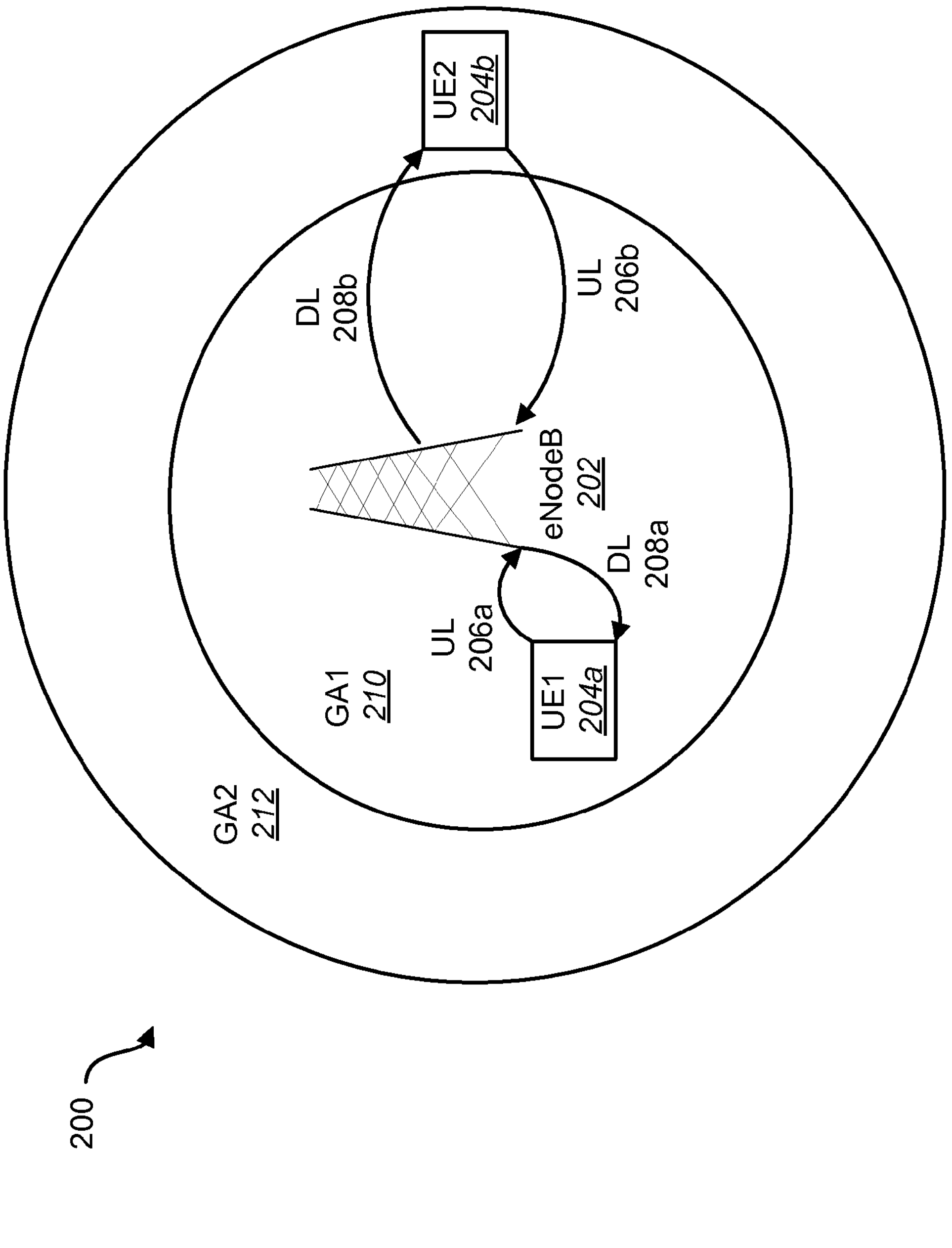
FIG. 2 illustrates a wireless communication system in which the present systems and methods may be practiced.

FIG. 2 illustrates a wireless communication system 200 in which the present systems and methods may be practiced. The wireless communication system 200 may include an eNodeB 202. The eNodeB 202 may be in electronic communication with a first UE 204*a* and a second UE 204*b*. The eNodeB 202 may send information to the first UE 204*a* over a downlink transmission 208*a* and receive information from the first UE 204*a* over an uplink transmission 206*a*. Likewise, the eNodeB 202 may send information to the second UE 204*b* over a downlink transmission 208*b* and receive information from the second UE 204*b* over an uplink transmission 206*b*.

The eNodeB 202 may be surrounded by one or more geographic areas (GA). In FIG. 2, the eNodeB 202 is surrounded by two geographic areas, GA1 210 and GA2 212. The geographic areas may define the areas within a relative distance from the eNodeB 202. For example, GA1 210 may include all the area that is within a certain radius of the eNodeB 202. Likewise, GA2 212 may include all the area that is within a certain radius of the eNodeB 202 that is not included in GA1 210. Alternatively, GA2 212 may include all the area that is not included in GA1 210. Alternatively, the geographic areas may not be of constant radius, but may instead be defined by contours of received uplink or downlink constant signal to interference plus noise ratio (SINR).

The eNodeB 202 may make scheduling decisions for a particular UE 204 based on the location of the UE 204. For example, a UE 204*a* in GA1 210 may receive different scheduling parameters than a UE 204*b* in GA2 212. The eNodeB 202 may determine the location of a particular UE 204 based on the received channel quality information from the UE 204.

In FIG. 2, UE1 204*a* is shown as operating within GA1 210 and UE2 204*b* is shown as operating within GA2 212. The eNodeB 202 may instruct UE1 204*a* and UE2 204*b* to send uplink transmissions 206 to the eNodeB 202. The uplink transmissions 206*a* of UE1 204*a* may use different multiple access schemes than the uplink transmissions 206*b* of UE2 204*b*. For example, in LTE-Advanced, a UE 204 may make use of SC-FDMA, OFDMA, clustered SC-FDMA, and NxSC-FDMA as uplink multiple access schemes. OFDMA, clustered SC-FDMA and NxSC-FDMA may be used as alternative multiple access schemes to SC-FDMA.

By using an OFDMA multiple access scheme, the communication system 200 may introduce advanced receivers for receiving MIMO. When MIMO communications are used, OFDMA may have the benefit of reducing the complexity of the receiver. SC-FDMA may have the benefit of reducing the PAPR and/or the cubic metric (CM). Thus, it may be beneficial for UE1 204*a* to use an OFDMA multiple access scheme when sending uplink transmissions 206*a* to the eNodeB 202 because UE1 204*a* is within GA1 210 and is thus relatively close to the eNodeB 202.

Clustered SC-FDMA and NxSC-FDMA may use non-continuous RB allocation. An eNodeB 202 may thus allocate non-continuous RBs for a UE 204 in clustered SC-FDMA or NxSC-FDMA to improve the block error rate (BLER) performance of the UE 204. The performance of the UE 204 may thus be improved compared to continuous RB allocation because the eNodeB 202 may select/allocate better quality RBs for each UE 204. However, the PAPR and/or CM of clustered SC-FDMA and NxSC-FDMA may be worse than SC-FDMA. Therefore, the transmit power for a UE using clustered SC-FDMA or NxSC-FDMA may be much lower than that of SC-FDMA. Thus, it may be beneficial for UE1 204*a* to use clustered SC-FDMA or NxSC-FDMA as the uplink multiple access scheme because UE1 204*a* is within GA1 210 and is thus relatively close to the eNodeB 202. Likewise, it may be beneficial for UE2 204*b* to use an SC-FDMA multiple access scheme when sending uplink transmissions 206*b* to the eNodeB 202 because UE2 204*b* is within GA2 212 and is thus on (or near) the cell edge.

Figure 3:
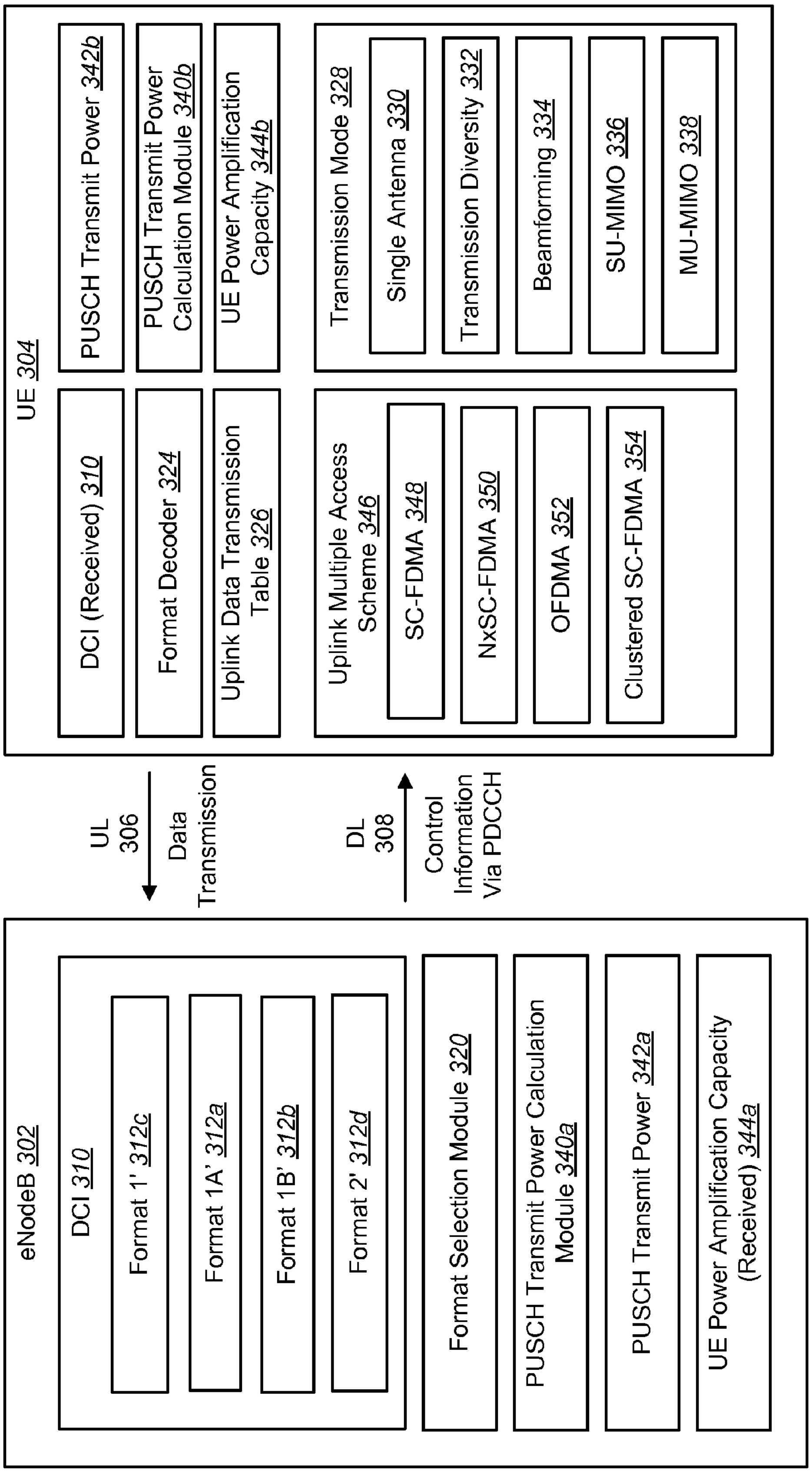
FIG. 3 illustrates various components that may be utilized to implement the present systems and methods.

FIG. 3 illustrates various components that may be utilized to implement the present systems and methods. An eNodeB 302 is shown. The eNodeB 302 may include downlink control information (DCI) 310 to be sent to a UE 304. The DCI 310 may be transmitted to the UE 304 via a downlink transmission 308 (e.g., via the PDCCH). A DCI 310 may be sent in a particular format 312. For example, the DCI 310 may be in Format 1' 312*c*, Format 1A' 312*a*, Format 1B' 312*b*, and Format 2' 312*d*.

DCI Format 1A' 312*a* is used for the scheduling of PUSCH transmissions. Table 1-1 includes examples of information that may be transmitted by means of the DCI Format 1A' 312*a*. Table 1-1 includes a column showing the field and another column for explanatory comments regarding the field.

TABLE 1-1

| Field | Comment |
|---|---|
| Format | Uplink grant or downlink assignment (Flag for UL/DL differentiation) |
| Hopping Flag | Frequency hopping on/off |
| RB Allocation | |
| MCS | |
| New Data Indicator | Toggled for each new transport block |
| TPC | Power control of PUSCH |
| Cyclic Shift for DMRS | FFS if always present or not (may depend on design of format 1A') |
| CQI Request | |
| RNTI/CRC | 16 bit RNTI implicitly encoded in CRC |

The format may be a flag for UL/DL (Uplink/Downlink) differentiation. In one configuration this field may be 1 bit. The hopping flag may also be 1 bit. The resource block allocation is included. The MCS is the modulation and coding scheme (and redundancy version), and it may be 5 bits in one configuration. The new data indicator may be 1 bit. The TPC (Transmit Power Control) field is the command for the scheduled PUSCH and may be 2 bits. The cyclic shift for DMRS (Demodulation Reference Signals) may be 3 bits in one configuration. The CQI request may be 1 bit. The last field shown in Table 1-1 is the RNTI/CRC (Radio Network Temporary Identity/Cyclic Redundancy Check) that may be a 16 bit field; the RNTI may be implicitly encoded in the CRC.

These are examples of possible contents of Format 1A 312*a*. Format 1A' 312*a* may include other information and/or may not include some of the above information.

DCI Format 1' 312*c* is used for the scheduling of PUSCH. Table 1-2 includes examples of information that may be transmitted by means of the DCI Format 1' 312*c*. Table 1-2 includes a column showing the field and another column for explanatory comments regarding the field.

TABLE 1-2

| Field | Comment |
|---|---|
| Format | Uplink grant or downlink assignment (Flag for UL/DL differentiation) |
| Resource Allocation Header | Indicates allocation type 0 or 1 (type 2 uses payload A, same as UL) |
| Hopping Flag | Frequency hopping on/off |
| RB Allocation | |
| MCS | |
| New Data Indicator | Toggled for each new transport block |
| TPC | Power control of PUSCH |
| Cyclic Shift for DMRS | FFS if always present or not (may depend on design of format 1A') |
| CQI Request | |
| RNTI/CRC | 16 bit RNTI implicitly encoded in CRC |

The format may be a flag for UL/DL differentiation. In one configuration this field may be 1 bit. A resource allocation header may indicate the resource allocation type (type 0 or type 1) and may also be 1 bit. The hopping flag may also be 1 bit. The resource block allocation is included. The MCS is the modulation and coding scheme (and redundancy version), and it may be 5 bits in one configuration. The new data indicator may be 1 bit. The TPC field is the command for the scheduled PUSCH and may be 2 bits. The cyclic shift for DMRS may be 3 bits in one configuration. The CQI request may be 1 bit. The last field shown in Table 1-2 is the RNTI/CRC (Radio Network Temporary Identity/Cyclic Redundancy Check) that may be a 16 bit field; the RNTI may be implicitly encoded in the CRC.

These are examples of possible contents of Format 1' 312*c*. Format 1' 312*c* may include other information and/or may not include some of the above information.

DCI Format 1B' 312*b* is used for the scheduling of PUSCH. Table 1-3 includes examples of information that may be transmitted by means of the DCI Format 1B' 312*b*. Table 1-3 includes a column showing the field and another column for explanatory comments regarding the field.

TABLE 1-3

| Field | Comment |
|---|---|
| Format | Uplink grant or downlink assignment (Flag for UL/DL differentiation) |
| Hopping Flag | Frequency hopping on/off |
| RB Allocation | |
| MCS | |
| Precoding Information | Precoding matrix (4 bits for 4Tx, 1-3 bits for 2Tx). FFS if this field can be removed and semi-static configuration is used instead. |
| New Data Indicator | Toggled for each new transport block |
| TPC | Power control of PUSCH |
| Cyclic Shift for DMRS | FFS if always present or not (may depend on design of format 1A') |
| CQI Request | |
| RNTI/CRC | 16 bit RNTI implicitly encoded in CRC |

The format may be a flag for UL/DL differentiation. In one configuration this field may be 1 bit. The hopping flag may also be 1 bit. The resource block allocation is included. The MCS is the modulation and coding scheme (and redundancy version), and it may be 5 bits in one configuration. The precoding information or Precoding Matrix Index (PMI) may also be included. The new data indicator may be 1 bit. The TPC field is the command for the scheduled PUSCH and may be 2 bits. The cyclic shift for DMRS may be 3 bits in one configuration. The CQI request may be 1 bit. The last field shown in Table 1-3 is the RNTI/CRC that may be a 16 bit field; the RNTI may be implicitly encoded in the CRC.

These are examples of possible contents of Format 1B' 312*b*. Format 1B' 312*b* may include other information and/or may not include some of the above information.

DCI Format 2' 312*d* is used for the scheduling of PUSCH. Table 1-4 includes examples of information that may be transmitted by means of the DCI Format 2' 312*d*. Table 1-4 includes a column showing the field and another column for explanatory comments regarding the field.

TABLE 1-4

| Field | Comment |
|---|---|
| Format | Uplink grant or downlink assignment (Flag for UL/DL differentiation) |
| Resource Allocation Header | Indicates allocation type 0 or 1 (type 2 uses payload A, same as UL) |
| Hopping Flag | Frequency hopping on/off |
| RB Allocation | |
| Number of Layers | 1, 2, 3, 4 layers. Number of bits may depend on the number of Tx antennas (2 for 4Tx, 0 otherwise). Also may depend on the number of Rx antennas in the UE. |
| Precoding Information | Precoding matrix (4 bits for 4Tx, 1-3 bits for 2Tx). FFS if this field can be removed and semi-static configuration is used instead. |
| MCS, first transport block | |
| MCS, second transport block | |
| New Data Indicator (1st TB) | Toggled for each new transport block |
| New Data Indicator (2nd TB) | Toggled for each new transport block |
| HARQ Swap Flag | Indicates whether the two transport blocks should be swapped before being fed to the soft buffers (for the two transport blocks) |
| TPC | Power control of PUSCH |
| Cyclic Shift for DMRS | FFS if always present or not (may depend on design of format 1A') |
| CQI Request | |
| RNTI/CRC | 16 bit RNTI implicitly encoded in CRC |

The format may be a flag for UL/DL (Uplink/Downlink) differentiation. In one configuration this field may be 1 bit. A resource allocation header may indicate the resource allocation type (type 0 or type 1) and may also be 1 bit. The hopping flag may also be 1 bit. The resource block allocation is included. The number of layers may indicate the number of layers. The number of bits for the number of layers field may depend on various factors including the number of antennas. The precoding information or Precoding Matrix Index (PMI) may also be included. There may be two codewords or two transport blocks. The MCS for the first transport block is the modulation and coding scheme (and redundancy version) for the first transport block, and it may be 5 bits in one configuration. There may also be an MCS for the second transport block. The new data indicator for the first transport block may be 1 bit. The new data indicator for the second transport block may also be 1 bit.

An HARQ (hybrid automatic repeat request) Swap Flag may indicate whether the two transport blocks should be swapped before being fed to the soft buffers (for the two transport blocks). The TPC field is the command for the scheduled PUSCH and may be 2 bits. The cyclic shift for DMRS may be 3 bits in one configuration. The CQI request may be 1 bit. The last field shown in Table 1-4 is the RNTI/CRC that may be a 16 bit field; the RNTI may be implicitly encoded in the CRC.

These are examples of possible contents of Format 2' 312*d*. Format 2' 312*d* may include other information and/or may not include some of the above information.

The meaning of the DCI formats 312 are described in more detail in 3GPP TS 36.212 v8.2.0 which applies to 3GPP LTE. LTE-Advanced is an extension of LTE. The pertinent DCI formats 312 are shown in Table 1-5. The DCI formats 312 may include assignments for the uplink data transmission. For example, the DCI formats 312 may include the RB allocation format, which may be contiguous or non-contiguous, the modulation and coding schemes (MCS) and a precoding matrix index (PMI). The RB allocation format may be a contiguous RB allocation format or a non-contiguous RB allocation format. The RB allocation format may further include the RB allocation. For example, Format 1' may use an RB allocation format that is capable of both contiguous and non-contiguous RB allocation. In contrast Format 1A' may use an RB allocation format that is only capable of contiguous RB allocation.

TABLE 1-5

| | RB Allocation Format | RB Allocation | Contents |
|---|---|---|---|
| Format 1' | Non-Contiguous | Contiguous/Non-Contiguous | RB allocation, MCS, etc. |
| Format 1A' | Contiguous | Contiguous only | RB allocation, MCS, etc. |
| Format 1B' | Contiguous | Contiguous only | RB allocation, MCS, PMI, etc. |
| Format 2' | Non-Contiguous | Contiguous/Non-Contiguous | RB allocation, MCS for codeword 1, MCS for codeword 2, PMI, etc. |

Table 1-5 illustrates that Format 1B' 312*b* and Format 2' 312*d* include PMI information. Format 1B' 312*b* includes only one piece of MCS information while Format 2' 312*d* includes two pieces of MCS information. The eNodeB 302 may include a format selection module 320 for selecting the appropriate DCI format 312 to be transmitted to the UE 304.

The format 312 of the DCI 310 may depend on the transmission mode 328 of the UE 304. Table 2 lists the transmission modes 328 and the corresponding DCI formats 312. The transmission mode 328 of the UE 304 is assumed to be configured by the eNodeB 302 via radio resource control (RRC) signaling. Format 1' 312*c* and Format 1A' 312*a* may be used for single input multiple output (SIMO) transmissions such as transmit diversity and beamforming. Format 2' 312*d* and Format 1A' 312*a* may be used for single user-MIMO (SU-MIMO) transmissions. Format 1B' 312*b* and Format 1A' 312*a* may be used for multiple user-MIMO (MU-MIMO) transmissions or RANK-1 SU-MIMO. RANK-1 SU-MIMO is a subset of SU-MIMO. The difference between SU-MIMO and RANK-1 SU-MIMO is that there is no layer multiplexing and only one codeword will be transmitted in RANK-1 SU-MIMO.

TABLE 2

| Transmission Mode | Formats |
|---|---|
| Single Antenna/Transmission Diversity/ Beamforming | Format 1'/Format 1A' |
| SU-MIMO | Format 2'/Format 1A' |
| MU-MIMO | Format 1B'/Format 1A' |

The eNodeB 302 may include a PUSCH transmit power calculation module 340*a*. The PUSCH transmit power calculation module 340 may be used to determine the PUSCH transmit power 342*a* used by a UE 304. The eNodeB 302 may send the PUSCH transmit power 342*a* to the UE 304. The PUSCH transmit power calculation module 340 is discussed in more detail below in relation to FIG. 8. The eNodeB 302 may also include the power amplification capacity for each power amplifier (PA) ($P_{PACap}$) 344*a* of a UE 304. $P_{PACap}$ 344*a* is an internal parameter for each UE 304 that defines the total transmission power of the UE 304. The manufacturers of the UE 304 may choose $P_{PACap}$ 344*a* to achieve desired cost and/or performance gains. $P_{PACap}$ 344*a* may be received from a UE 304. $P_{PACap}$ 344*a* is discussed in further detail below in relation to FIG. 11.

The eNodeB 302 may determine the location of a UE 304. For example, the eNodeB 302 may determine the location of a UE 304 using path loss models. The eNodeB 302 may determine the uplink multiple access scheme 346 for the UE 304 according to the location of the UE 304. The eNodeB 302 may also determine the value of an uplink maximum transmission power limiting factor according to the location of the UE 304. The eNodeB 302 may select a format 312 for the DCI 310 according to the uplink multiple access scheme 346 selected, the uplink maximum transmission power limiting factor, or both.

User equipment (UE) 304 is also shown in FIG. 3. The UE 304 may include a received DCI 310. The DCI 310 may be received from the eNodeB 302. The UE 304 may also include a format decoder 324. The format decoder 324 may be configured to determine the format 312 of the received DCI 310. The UE 304 may use different uplink multiple access schemes 346. For example, the UE 304 may use SC-FDMA 348 or an alternative uplink multiple access scheme 346 such as NxSC-FDMA 350, OFDMA 352, or clustered SC-FDMA 354.

The UE 304 may include an uplink data transmission table 326. The uplink data transmission table 326 may be configured to specify the uplink multiple access scheme 346 for the UE 304 according to the format of the received DCI 310. For example, the uplink data transmission table 326 may specify that the UE 304 is to use SC-FDMA 348 as the uplink multiple access scheme 346 for certain formats of received DCI 310 and an alternative uplink multiple access scheme 346 for other formats 312 of received DCI 310. Examples of uplink data transmission tables 326 used in the present systems and methods are shown in Table 3, Table 4, Table 5, and Table 6.

TABLE 3

| | RB Allocation Format | RB Allocation | Contents | Uplink Multiple access scheme |
|---|---|---|---|---|
| Format 1' | Non-Contiguous | Contiguous/ Non-Contiguous | RB allocation, MCS, etc. | Alternative uplink multiple access scheme |
| Format 1A' | Contiguous | Contiguous only | RB allocation, MCS, etc. | SC-FDMA |
| Format 1B' | Contiguous | Contiguous only | RB allocation, MCS, PMI, etc. | Alternative uplink multiple access scheme |
| Format 2' | Non-Contiguous | Contiguous/ Non-Contiguous | RB allocation, MCS for codeword 1, MCS for codeword 2, PMI, etc. | Alternative uplink multiple access scheme |

TABLE 4

| | RB Allocation Format | RB Allocation | Contents | Uplink Multiple access scheme |
|---|---|---|---|---|
| Format 1' | Non-Contiguous | Contiguous/ Non-Contiguous | RB allocation, MCS, etc. | Alternative uplink multiple access scheme |
| Format 1A' | Contiguous | Contiguous only | RB allocation, MCS, etc. | SC-FDMA |
| Format 1B' | Contiguous | Contiguous only | RB allocation, MCS, PMI, etc. | SC-FDMA |
| Format 2' | Non-Contiguous | Contiguous/ Non-Contiguous | RB allocation, MCS for codeword 1, MCS for codeword 2, PMI, etc. | Alternative uplink multiple access scheme |

TABLE 5

| | RB Allocation Format | RB Allocation | Contents | Uplink Multiple access scheme |
|---|---|---|---|---|
| Format 1' | Non-Contiguous | Contiguous/ Non-Contiguous | RB allocation, MCS, etc. | Alternative uplink multiple access scheme |
| Format 1A' | Contiguous | Contiguous only | RB allocation, MCS, etc. | SC-FDMA |
| Format 1B' | Contiguous | Contiguous only | RB allocation, MCS, PMI, SC-FDMA/OFDMA switching bit, etc. | SC-FDMA/ Alternative uplink multiple access scheme |
| Format 2' | Non-Contiguous | Contiguous/ Non-Contiguous | RB allocation, MCS for codeword 1, MCS for codeword 2, PMI, etc. | Alternative uplink multiple access scheme |

TABLE 6

| | RB Allocation Format | RB Allocation | Contents | Uplink Multiple access scheme |
|---|---|---|---|---|
| Format 1' | Non-Contiguous | Contiguous/ Non-Contiguous | RB allocation, MCS, etc. | SC-FDMA/ Alternative uplink multiple access scheme |
| Format 1A' | Contiguous | Contiguous only | RB allocation, MCS, etc. | SC-FDMA |
| Format 1B' | Contiguous | Contiguous only | RB allocation, MCS, PMI, etc. | SC-FDMA |
| Format 2' | Non-Contiguous | Contiguous/ Non-Contiguous | RB allocation, MCS for codeword 1, MCS for codeword 2, PMI, etc. | SC-FDMA/ Alternative uplink multiple access scheme |

As discussed above, the UE 304 may operate in different transmission modes 328. For example, the UE 304 may operate in single antenna mode 330, transmission diversity mode 332, beamforming mode 334, SU-MIMO mode 336, and MU-MIMO mode 338. The eNodeB 302 may select the format of the DCI 310 according to the transmission mode 328 of the UE 304. Upon selection of a multiple access scheme 346 for the uplink transmission 306, the UE 304 may then send an uplink transmission 306 to the eNodeB 302 according to the selected multiple access scheme 346. Thus, the uplink transmission 306 may be modulated according to SC-FDMA 348, OFDMA 352, clustered SC-FDMA 354, or NxSC-FDMA 350.

The UE 304 may also include a PUSCH transmit power calculation module 340*b*. The PUSCH transmit power calculation module 340*b* may be used to determine the PUSCH transmit power 342*b* used by a UE 304. The PUSCH transmit power calculation module 340 is discussed in more detail below in relation to FIG. 8. The UE 304 may also include the UE power amplification capacity ($P_{PACap}$) 344*b* of the UE 304. As discussed above, $P_{PACap}$ 344*b* is an internal parameter for each UE 304 that defines the total transmission power of a UE 304. The manufacturers of the UE 304 may choose $P_{PACap}$ 344*b* to achieve desired cost and/or performance gains.

Figure 4:
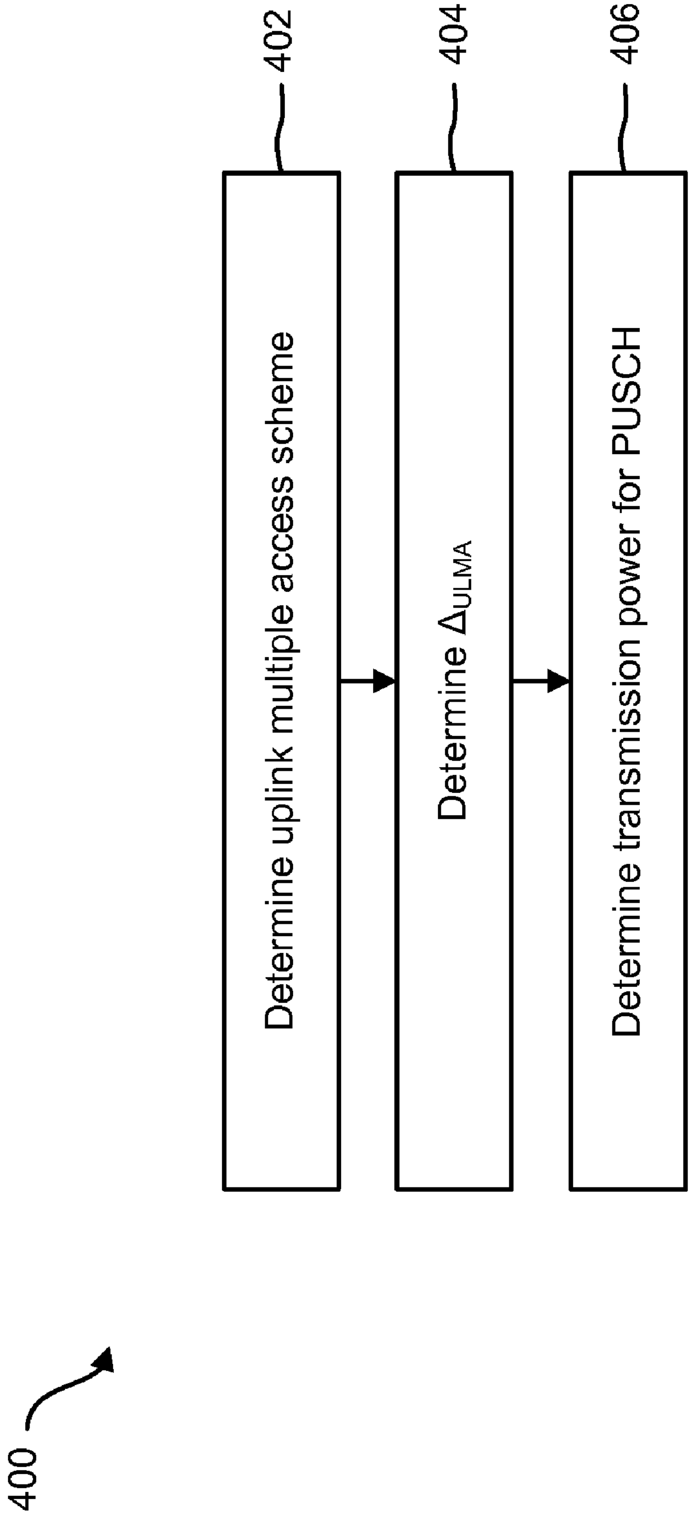
FIG. 4 is a flow diagram illustrating a method for uplink power control in LTE-A.

FIG. 4 is a flow diagram illustrating a method 400 for uplink power control in LTE-A. The method 400 may be performed by a UE 304 and/or an eNodeB 302. The UE 304 and/or eNodeB 302 may determine 402 the uplink multiple access scheme 346. The UE 304 and/or eNodeB 302 may then determine 404 the value for an uplink maximum transmission power limiting factor. The uplink maximum transmission power limiting factor may be an uplink multiple access scheme 346 dependent value used by a UE 304 to define the maximum transmission power for the UE 304. The maximum transmission power for the UE 304 may also be referred to as the operating point of the power amplifier (PA). The uplink maximum transmission power limiting factor may also be referred to as $\Delta_{ULMA}$. The maximum transmission power for the UE 304 may be a function of $P_{MAX}$, which is the UE 304 power class, and the uplink multiple access scheme 346. The UE 304 power class may define the total transmission power of a UE 304. The UE 304 power class may thus depend on the physical capabilities of the UE 304.

The value of $\Delta_{ULMA}$ may depend on the uplink multiple access scheme 346 selected. For example, the value of $\Delta_{ULMA}$ may be specified based on the CM values of each uplink multiple access scheme. Examples of CM values for uplink multiple access schemes are shown in Table 6A.

TABLE 6A

| | SC-FDMA | OFDMA | Clustered SC-FDMA | NxSC-FDMA |
|---|---|---|---|---|
| CM | 1.60 | 4.00 | 3.20 | 3.60 |
| The CM difference from SC-FDMA | 0 | 2.4 | 1.6 | 2.0 |

The CM values of SC-FDMA 348, OFDMA 352, Clustered SC-FDMA 354 and NxSC-FDMA 350 may be 1.60 dB, 4.00 dB, 3.20 dB and 3.60 dB respectively. Therefore, the CM difference from SC-FDMA 348 is 0 dB, 2.4 dB, 1.6 dB and 2.0 dB. The value of $\Delta_{ULMA}$ for each uplink multiple access scheme may be set to the same value of the CM difference from SC-FDMA 348.

For example, if the uplink multiple access scheme 346 is SC-FDMA 348, the value of $\Delta_{ULMA}$ may be 0. If clustered SC-FDMA 354 is selected as the uplink multiple access scheme 346, the value of $\Delta_{ULMA}$ may be 1.6. If NxSC-FDMA 350 is selected as the uplink multiple access scheme 346, the value of $\Delta_{ULMA}$ may be 2.0. If OFDMA 352 is selected as the uplink multiple access scheme 346, the value of $\Delta_{ULMA}$ may be 2.4. For a new uplink multiple access scheme 346 (i.e. one that is not SC-FDMA 354), $\Delta_{ULMA}$ may take a fixed value which is in a range from 1 dB to 4 dB. As discussed above, the fixed value of $\Delta_{ULMA}$ may be selected according to the CM difference between the uplink multiple access scheme 346 and SC-FDMA 348.

The UE 304 and/or the eNodeB 302 may then use the value of $\Delta_{ULMA}$ to determine 406 the PUSCH transmission power 342. For example, the UE 304 and/or the eNodeB 302 may use the value of $\Delta_{ULMA}$ to determine 406 the PUSCH transmission power $P_{PUSCH}$ 342 for subframe i using:

$$P_{PUSCH}(i)=\min\{P_{MAX}-\Delta_{ULMA},10\log_{10}(M_{PUSCH}(i))+P_{O\_PUSCH}(j)+\alpha\cdot PL+\Delta_{TF}(i)+f(i)\}. \quad (1)$$

$P_{PUSCH}$ 342 may be calculated using a PUSCH transmit power calculation module 340. The variables and parameters used in Equation 1 by the PUSCH transmit power calculation module 340 are discussed in more detail below in relation to FIG. 8.

Figure 5:
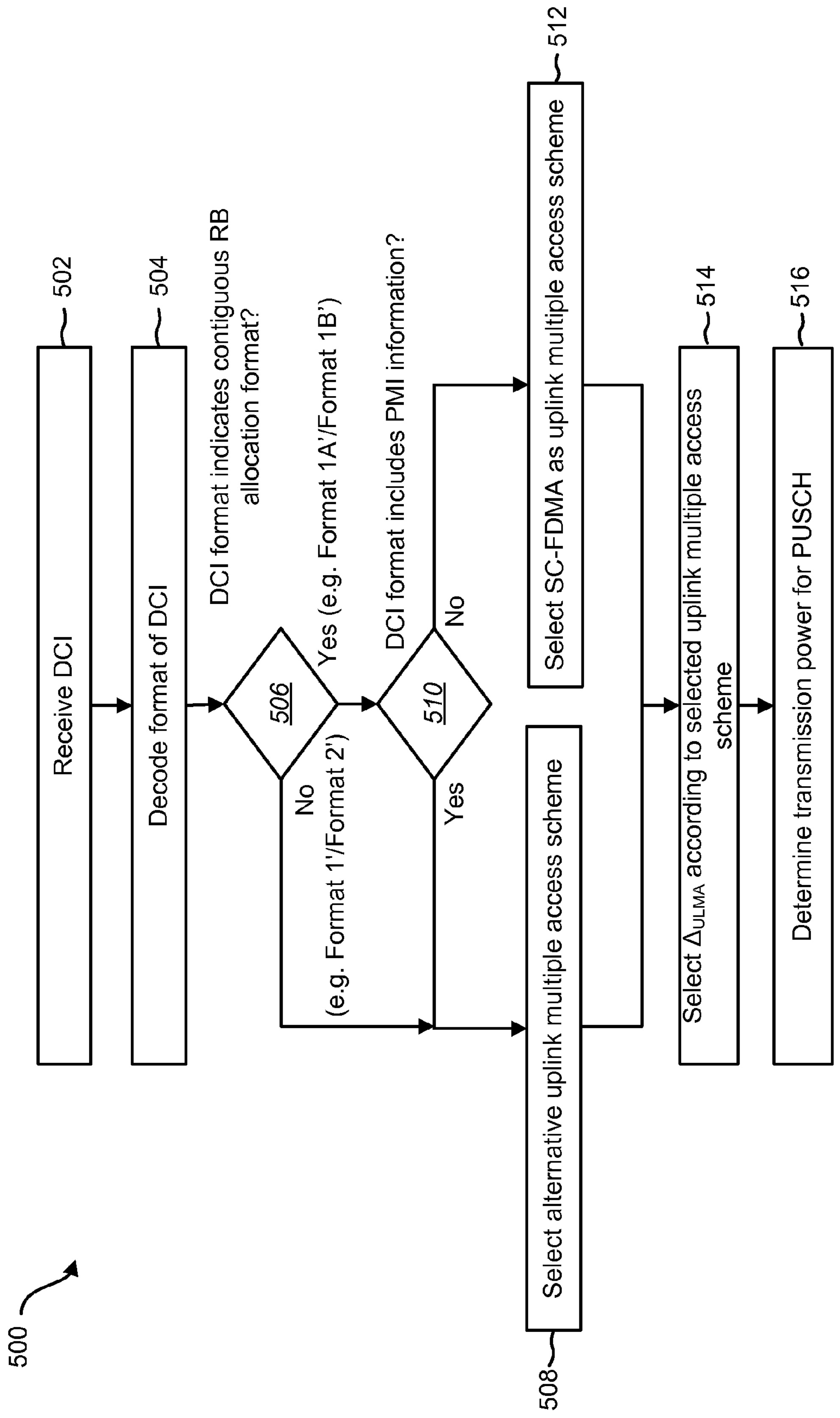
FIG. 5 is a flow diagram illustrating a more detailed method for uplink power control in LTE-A.

FIG. 5 is a flow diagram illustrating a more detailed method 500 for uplink power control in LTE-A. The method 500 of FIG. 5 may be performed by a UE 304. The UE 304 may receive 502 a DCI 310. The UE 304 may receive 502 the DCI 310 via the PDCCH. The UE 304 may decode 504 the format 312 of the DCI 310. The UE 304 may then determine 506 whether the DCI format 312 includes an RB allocation format that only allows contiguous RB allocation. Contiguous and non-contiguous RB allocations are discussed in more detail below in relation to FIG. 12. Format 1A' and Format 1B' may use a different RB allocation format than Format 1' and Format 2'. The RB allocation format used by Format 1A' and Format 1B' may thus only indicate contiguous RB allocation. In contrast, the RB allocation format used by Format 1' and Format 2' may indicate both contiguous and non-contiguous RB allocation.

Figure 12:
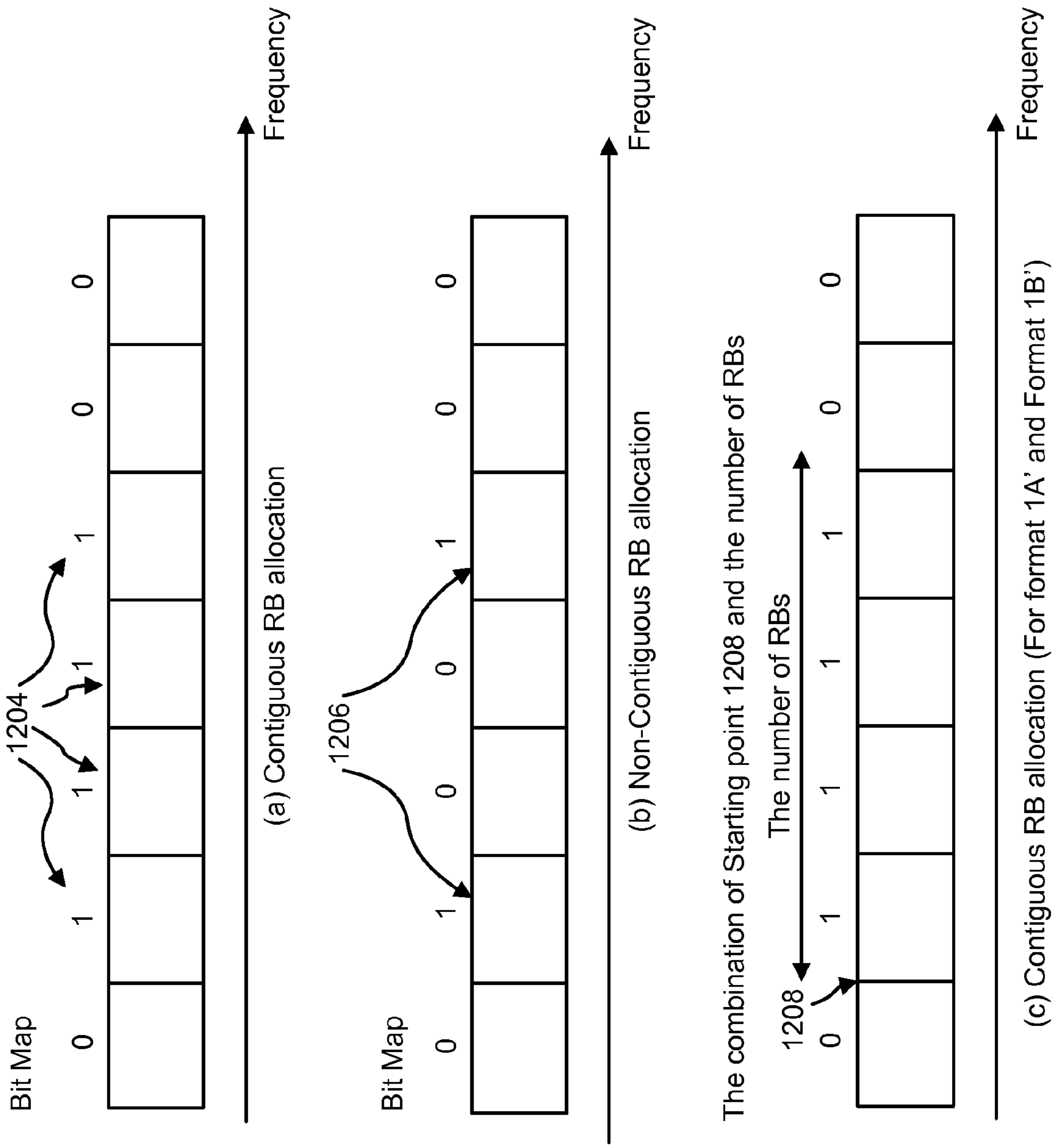
FIG. 12 is an example of contiguous RB allocations such as those in Format 1A' and Format 1B' of the DCI and non-contiguous RB allocations such as those in Format 1' and Format 2' of the DCI.

If the DCI format 312 includes an RB allocation format that allows for both a contiguous RB allocation and a non-contiguous RB allocation (e.g. Format 1'/Format 2'), as shown in FIG. 12(*a*) or 12(*b*), the UE 304 may select 508 an alternative uplink multiple access scheme 346. If the DCI format 312 includes an RB allocation format that only allows a contiguous RB allocation (e.g. Format 1A'/Format 1B'), as shown in FIG. 12(*c*), the UE 304 may determine 510 whether the DCI format 312 includes PMI information. If the DCI format 312 includes PMI information, the UE 304 may select 510 an alternative uplink multiple access scheme 346. If the DCI format 312 does not include PMI information, the UE 304 may select 512 SC-FDMA 348 as the uplink multiple access scheme 346. The alternative multiple access scheme may be OFDMA 352 for this case.

Once the UE 304 has selected an uplink multiple access scheme 346, the UE 304 may select 514 the value of $\Delta_{ULMA}$ according to the selected uplink multiple access scheme 346. The value of $\Delta_{ULMA}$ for each ULMA scheme may be stored on the UE 304. The UE 304 may then determine 516 the transmission power for the PUSCH 342.

Figure 6:
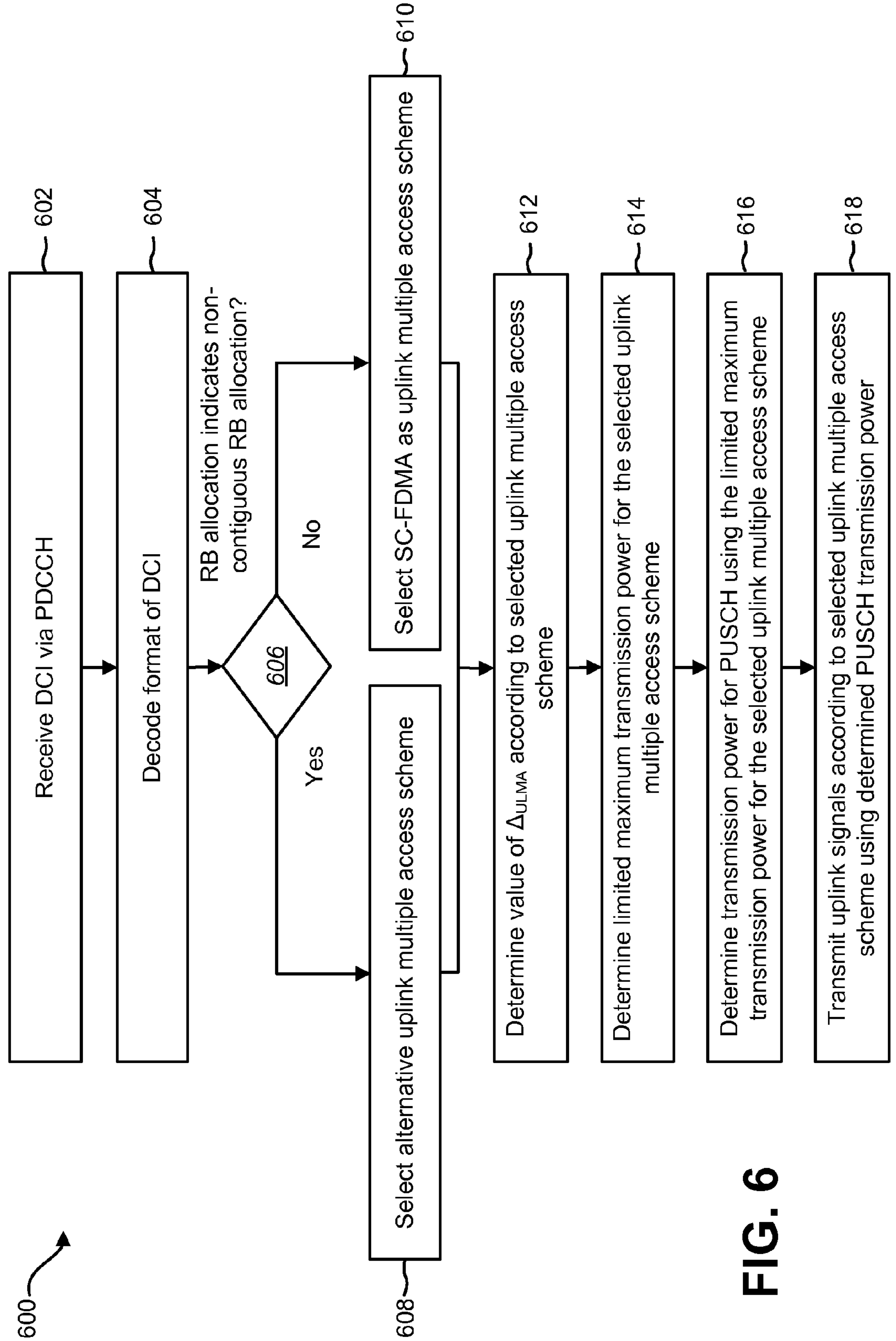
FIG. 6 is a flow diagram illustrating an alternative method for uplink power control in LTE-A.

FIG. 6 is a flow diagram illustrating an alternative method 600 for uplink power control in LTE-A. A UE 304 may receive 602 a DCI 310 via the PDCCH. The UE 304 may decode 604 the format 312 of the DCI 310. The UE 304 may next determine 606 whether the DCI format 312 includes contiguous RB allocation or non-contiguous RB allocation. If the DCI format 312 includes a non-contiguous RB allocation, as shown in FIG. 12(*b*), the UE 304 may select 608 an alternative uplink multiple access scheme 346. In this case, the alternative uplink multiple access scheme may be clustered SC-FDMA 354. If the DCI format 312 includes a contiguous RB allocation, as shown in FIG. 12(*a*) and FIG. 12(*c*), the UE 304 may select 610 SC-FDMA 348 as the uplink multiple access scheme 346.

Once the UE 304 has selected an uplink multiple access scheme 346, the UE 304 may determine 612 the value of $\Delta_{ULMA}$ according to the selected uplink multiple access scheme 346. The UE 304 may then determine 614 the limited maximum transmission power for the selected ULMA scheme using $\Delta_{ULMA}$. For example, the limited maximum transmission power may be $$P_{PUSCH\text{-}MAX}=P_{MAX}-\Delta_{ULMA}. \quad (2)$$

where $P_{PUSCH\text{-}MAX}$ is the limited maximum transmission power for a UE 304 and $P_{MAX}$ is the maximum allowed power, which depends on the UE 304 power class.

The UE 304 may then determine 616 the transmission power 342 for the PUSCH using the limited maximum transmission power for the selected ULMA scheme 346. For example, the UE may determine the PUSCH transmission power 342 using Equation 1 above. The UE 304 may then transmit 618 the uplink data signal 306 according to the selected uplink multiple access scheme 346 using the determined PUSCH transmission power 342.

Figure 6A:
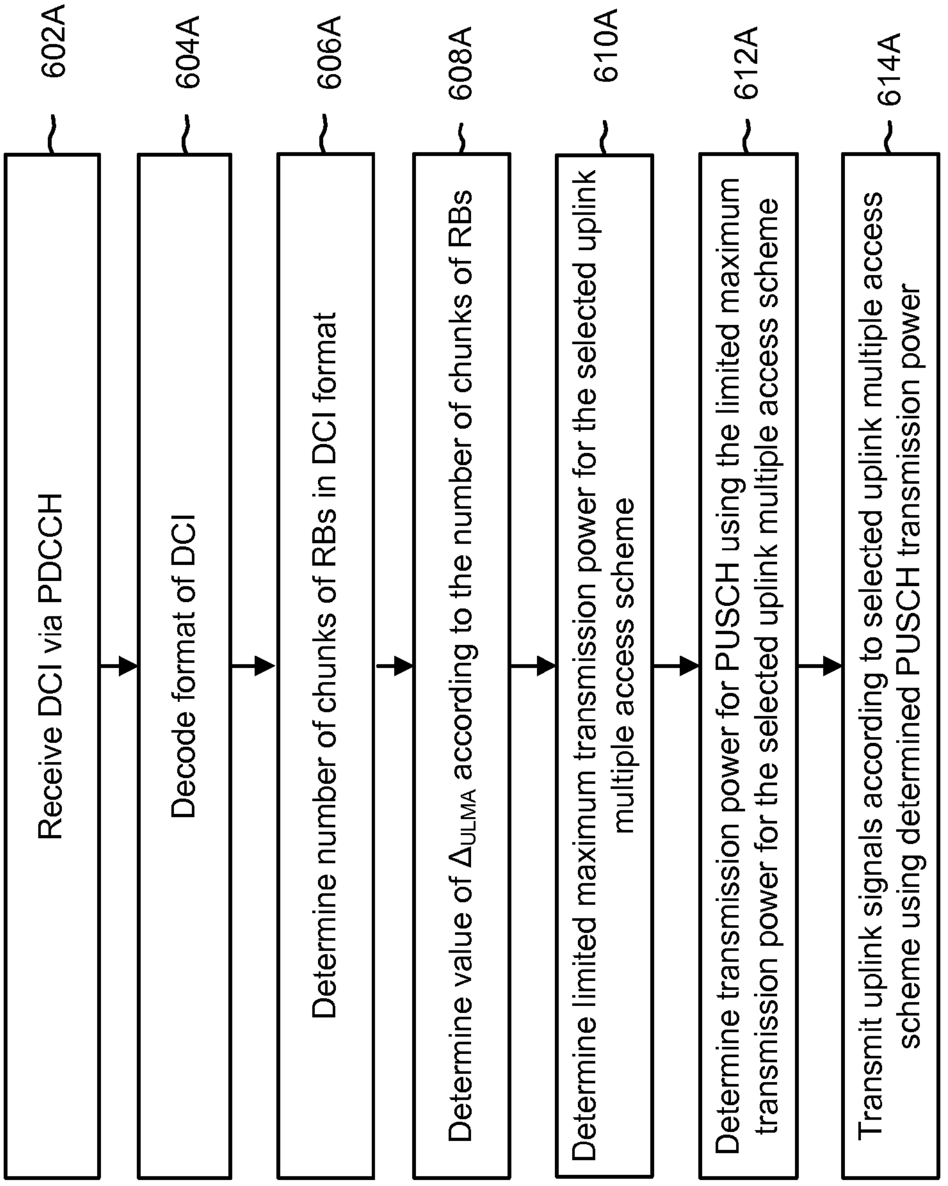
FIG. 6A is a flow diagram illustrating an alternative method for uplink power control in LTE-A using the number of chunks of RBs.

FIG. 6A is a flow diagram illustrating an alternative method 600A for uplink power control in LTE-A using the number of chunks of RBs. A UE 304 may receive 602A a DCI 310 via the PDCCH. The UE 304 may decode 604A the format 312 of the DCI 310. The UE 304 may then determine 606A the number of chunks indicated in the RB allocation which is included in DCI format. The number of chunks in an RB allocation may indicate the number of separate, non-adjacent RB blocks allocated. Chunks are described in further detail below in relation to FIG. 12A. According to the number of chunks, the UE 304 may determine 610A the different values of $\Delta_{ULMA}$.

The UE 304 may then determine 612A the limited maximum transmission power for the selected ULMA scheme using $\Delta_{ULMA}$. The UE 304 may then determine 614A the transmission power 342 for the PUSCH using the limited maximum transmission power for the selected ULMA scheme 346. The UE 304 may then transmit 616A the uplink data signal 306 according to the selected uplink multiple access scheme 346 using the determined PUSCH transmission power 342.

Figure 7:
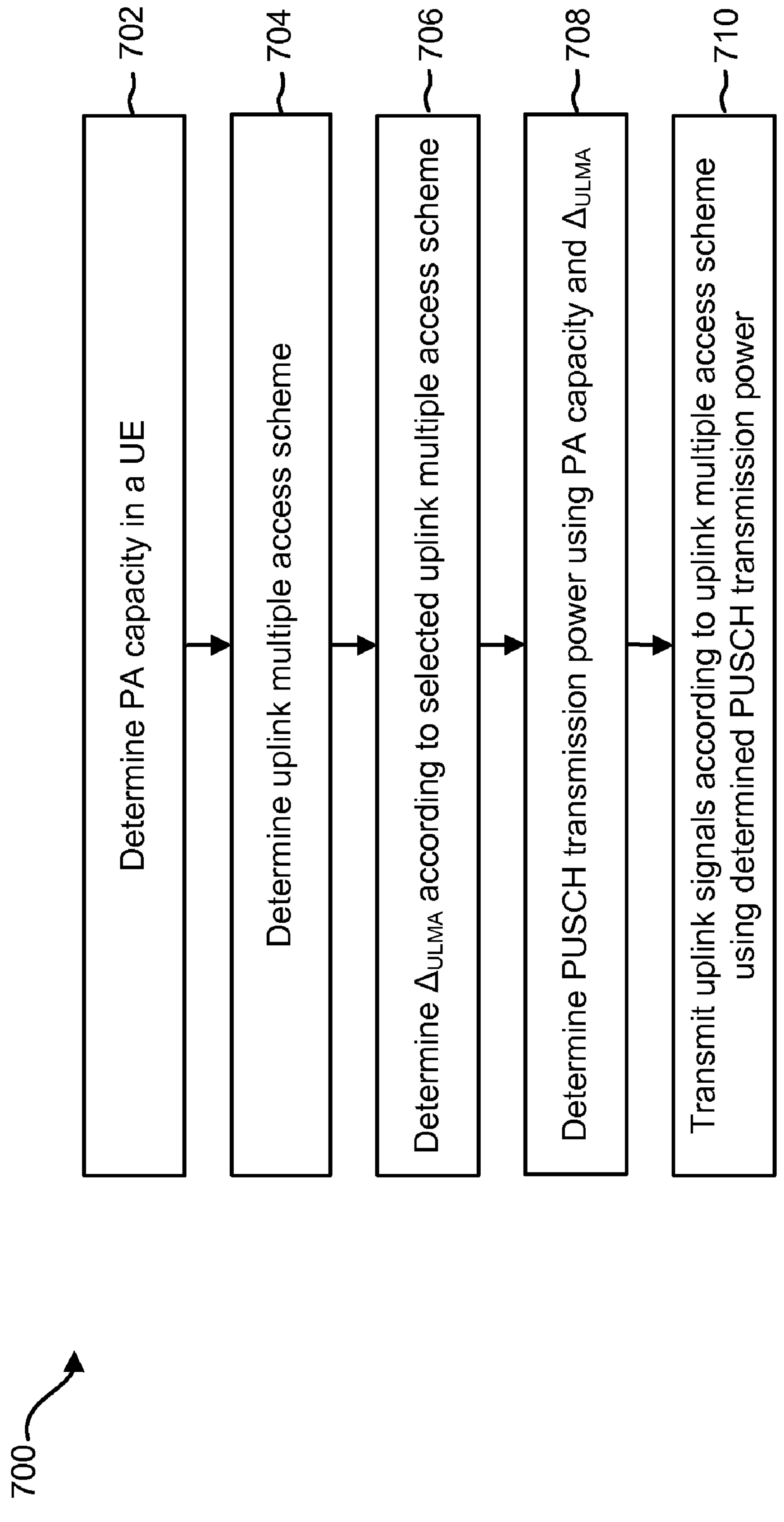
FIG. 7 is a flow diagram illustrating an alternative method for uplink power control in LTE-A.

FIG. 7 is a flow diagram illustrating an alternative method 700 for uplink power control in LTE-A. A UE 304 may determine 702 the value of $P_{PACap}$ 344b for the UE 304. The UE 304 may next determine 704 the uplink multiple access scheme 346. As discussed above, the uplink multiple access scheme 346 may be SC-FDMA 348, OFDMA 352, clustered SC-FDMA 354, or NxSC-FDMA 350. The UE 304 may determine 706 the value of $\Delta_{ULMA}$ according to the determined uplink multiple access scheme 346. The UE 304 may then determine 708 the PUSCH transmission power 342 using the PA capacity and the value of $\Delta_{ULMA}$. The UE 304 may transmit 710 uplink data signals 306 via the PUSCH according to the uplink multiple access scheme 346 using the determined PUSCH transmission power 342.

Figure 8:
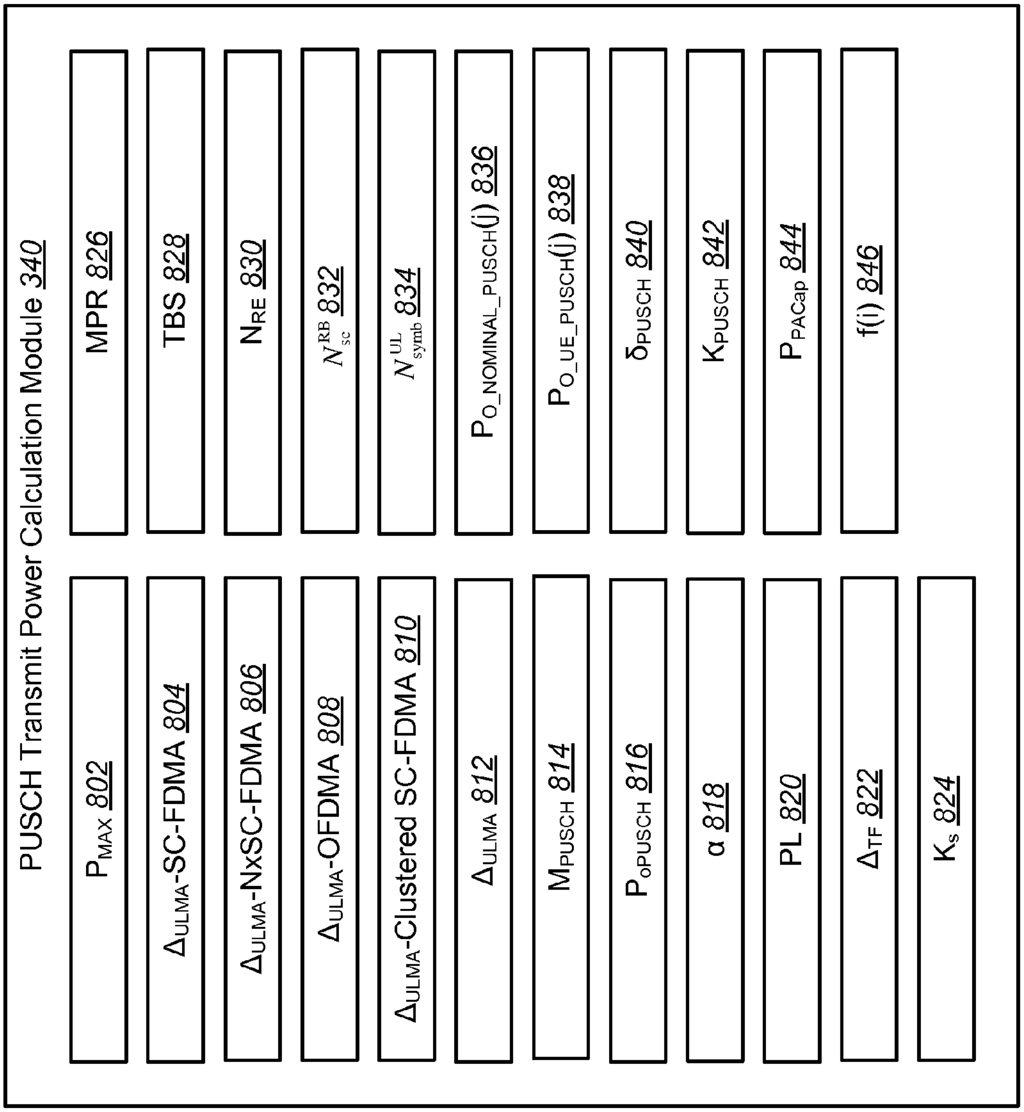
FIG. 8 is a block diagram illustrating some of the variables and parameters that may be used in a PUSCH transmit power calculation module.

FIG. 8 is a block diagram illustrating some of the variables and parameters that may be used in a PUSCH transmit power calculation module 340. As discussed above in relation to FIG. 4, the PUSCH transmit power calculation module 340 may calculate the $P_{PUSCH}$ using Equation 1. Alternatively, the PUSCH transmit power calculation module 340 may calculate the $P_{PUSCH}$ using:

$$P_{PUSCH}(i)=\min\{\min(P_{MAX},P_{PACap}-\Delta_{ULMA}),10\log_{10}(M_{PUSCH}(i))+P_{O\_PUSCH}(j)+\alpha\cdot PL+\Delta_{TF}(i)+f(i)\}. \quad (3)$$

Equation 3 is discussed in more detail below in relation to FIG. 11.

In the PUSCH transmit power calculation module 340, $P_{MAX}$ 802 is the maximum allowed power, which depends on the UE 304 power class. $\Delta_{ULMA}$ 812 is the uplink multiple access scheme 346 specific power limiting factor. The PUSCH transmit power calculation module 340 may include a different value of $\Delta_{ULMA}$ 812 for each uplink multiple access scheme 346. For example, the PUSCH transmit power calculation module 340 may include a value for $\Delta_{ULMA}$-SC-FDMA 804, a value for $\Delta_{ULMA}$-OFDMA 808, a value for $\Delta_{ULMA}$-clustered SC-FDMA 810, and a value for $\Delta_{ULMA}$-NxSC-FDMA 806. For example, the value of $\Delta_{ULMA}$-SC-FDMA 804 may be 0, the value of $\Delta_{ULMA}$-OFDMA 808 may be 2.4, the value of $\Delta_{ULMA}$-clustered SC-FDMA 810 may be 1.6, and the value of $\Delta_{ULMA}$-NxSC-FDMA 806 may be 1.6.

The PUSCH transmit power calculation module 340 may use a parameter $P_{O\_PUSCH}(j)$ 816 to calculate the PUSCH transmit power using Equation 1 or Equation 3. $P_{O\_PUSCH}(j)$ 816 is a parameter composed of the sum of an 8-bit cell specific nominal component $P_{O\_NOMINAL\_PUSCH}(j)$ 836, signaled from higher layers for j=0,1 in the range of [−126,24] dBm with 1 dB resolution, and a 4-bit UE specific component $P_{O\_UE\_PUSCH}(j)$ 838 configured by the RRC for j=0,1 in the range of [−8,7] dB with 1 dB resolution. For PUSCH (re) transmissions corresponding to a configured scheduling grant, j=0. For PUSCH (re)transmissions corresponding to a received PDCCH with DCI format 0 associated with a new packet transmission, j=1.

The PUSCH transmit power calculation module 340 may also include a 818, where $\alpha\epsilon\{0,0.4,0.5,0.6,0.7,0.8,0.9,1\}$ is a 3-bit cell specific parameter provided by higher layers. The PUSCH transmit power calculation module 340 may also include the path loss (PL) 820. PL 820 is the downlink path loss estimate calculated by the UE 304. The PUSCH transmit power calculation module 340 may further include $\Delta_{TF}(i)$ 822. $\Delta_{TF}(i)$ 822 may be calculated using:

$$\Delta_{TF}(i)=10\log_{10}(2^{MPR(i)\cdot K_S}-1). \quad (4)$$

where $K_S$ 824 is a cell specific parameter given by the RRC: $K_S$=1.25. $K_S$ may be a parameter that indicates the difference of modulation and coding scheme (MCS). If $K_S$=1.25, the difference of MCS may be compensated in the transmission power control process. If $K_S$=0, $$\Delta_{TF}(i)=0 \quad (5)$$

and the difference of MCS may be ignored. From Equation 4, $$MPR(i)=TBS(i)/N_{RE}(i) \quad (6)$$

where TBS(i) 828 is the Transport Block Size for subframe i and $N_{RE}(i)$ 830 is the number of resource elements for subframe i determined by:

$$N_{RE}(i)2M_{PUSCH}(i)\cdot N_{sc}^{RB}\cdot N_{symb}^{UL} \quad (7)$$

where $M_{PUSCH}(i)$ 814 is the scheduled bandwidth for uplink transmission, expressed as a number of resource blocks in the frequency domain, $N_{sc}^{RB}$ 832 is the resource block size in the frequency domain, expressed as a number of subcarriers, and $N_{symb}^{UL}$ 834 is the number of SC-FDMA symbols within a slot. For LTE, $N_{symb}^{UL}$ 834 equals seven and $N_{sc}^{RB}$ 832 equals twelve. The resource block is the unit of resource allocation in LTE and is represented by $N_{sc}^{RB}$ 832 subcarriers and $N_{symb}^{UL}$ 834 SC-FDMA symbols. Moreover, $N_{sc}^{RB}\cdot N_{symb}^{UL}$ may represent the number of resource elements in one resource block. In LTE, an eNodeB 102 may allocate two consecutive slots for each resource block. Thus, Equation 7 above may represent the number of resource elements for subframe i.

$\delta_{PUSCH}$ 840 is a UE 304 specific correction value, also referred to as a TPC command, and is included in PDCCH with DCI format 0 or jointly coded with other TPC commands in PDCCH with DCI format 3/3A. The current PUSCH power control adjustment state f(i) 846 is given by f(i) 846 which is defined by:

$$f(i)=f(i-1)+\delta_{PUSCH}(i-K_{PUSCH}) \quad (8)$$

if f(*) represents accumulation; where f(0)=0.

The value of $K_{PUSCH}$ 842 is 4 for FDD. $\delta_{PUSCH}$=0 dB for a subframe where no TPC command is decoded, where DRX occurs, or where i is not an uplink subframe in TDD. The $\delta_{PUSCH}$ dB accumulated values signaled on PDCCH with DCI format 0 are [−1, 0, 1, 3]. The $\delta_{PUSCH}$ dB accumulated values signaled on PDCCH with DCI format 3/3A are one of [−1, 1] or [−1, 0, 1, 3] as semi-statically configured by higher layers.

If the UE 304 has reached the maximum power, positive TPC commands may not be accumulated. If the UE 304 has reached minimum power, negative TPC commands may not be accumulated. The UE 304 may reset accumulation at cell-change, when entering/leaving RRC active state, when an absolute TPC command is received, when $P_{O\_UE\_PUSCH}(j)$ 838 is received, or when the UE 304 (re)synchronizes.

If f(*) represents current absolute value, then:

$$f(i)=\delta_{PUSCH}(i-K_{PUSCH}) \quad (9)$$

where $\delta_{PUSCH}(i-K_{PUSCH})$ was signaled on the PDCCH with DCI format 0 on subframe $i-K_{PUSCH}$. In Equation 9, the value of $K_{PUSCH}$ 842 is 4 for FDD. The $\delta_{PUSCH}$ dB absolute values signaled on the PDCCH with DCI format 0 are [−4, −1, 1, 4].

For a subframe where no PDCCH with DCI format 0 is decoded, where DRX occurs, or where i is not an uplink subframe in TDD, the current PUSCH power control adjustment state f(i) 846 is:

$$f(i)=f(i-1) \tag{10}$$

The PUSCH transmit power calculation module 304 may also include the power amplifier capacity ($P_{PACap}$) 844.

Figure 9:
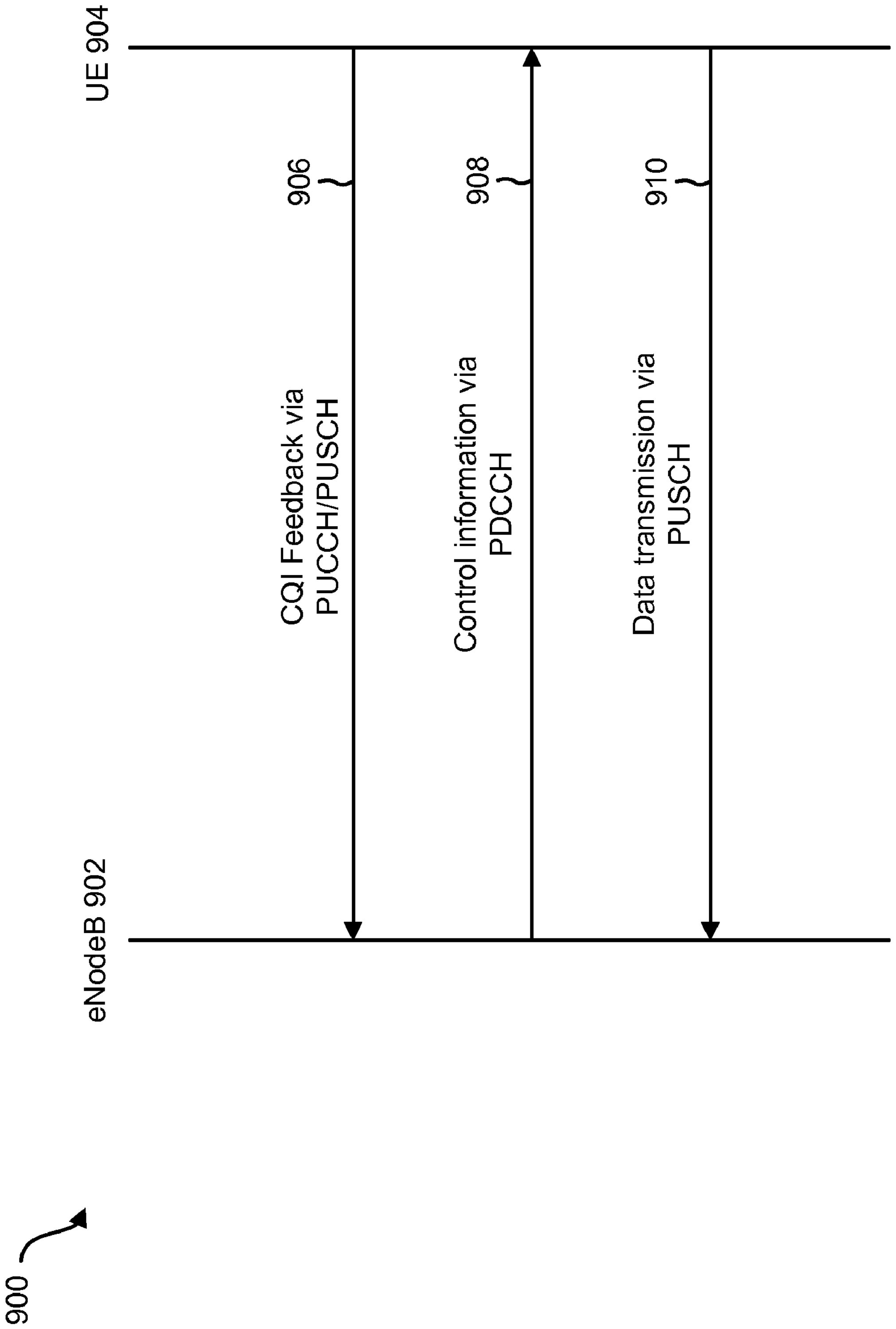
FIG. 9 illustrates L1/L2 signaling between the eNodeB and the UE.

FIG. 9 illustrates L1/L2 signaling between the eNodeB 902 and the UE 904. L1/L2 signaling is the sending of control information from the eNodeB 902 to the UE 904 via the PDCCH 908. The UE 904 sends CQI feedback to the eNodeB 902 via the PUCCH/PUSCH 906. The eNodeB 902 sends control information to the UE 904 via the PDCCH 908. The control information on the PDCCH 908 may include a DCI 310 to instruct the UE 904 whether to select SC-FDMA 348 as the uplink multiple access scheme 346 or to use an alternative uplink multiple access scheme 346. The UE 904 may then send the uplink data transmission 306 via the PUSCH 910. The uplink data transmission 306 on the PUSCH 910 may be modulated according to the selected uplink multiple access scheme 346.

Figure 10:
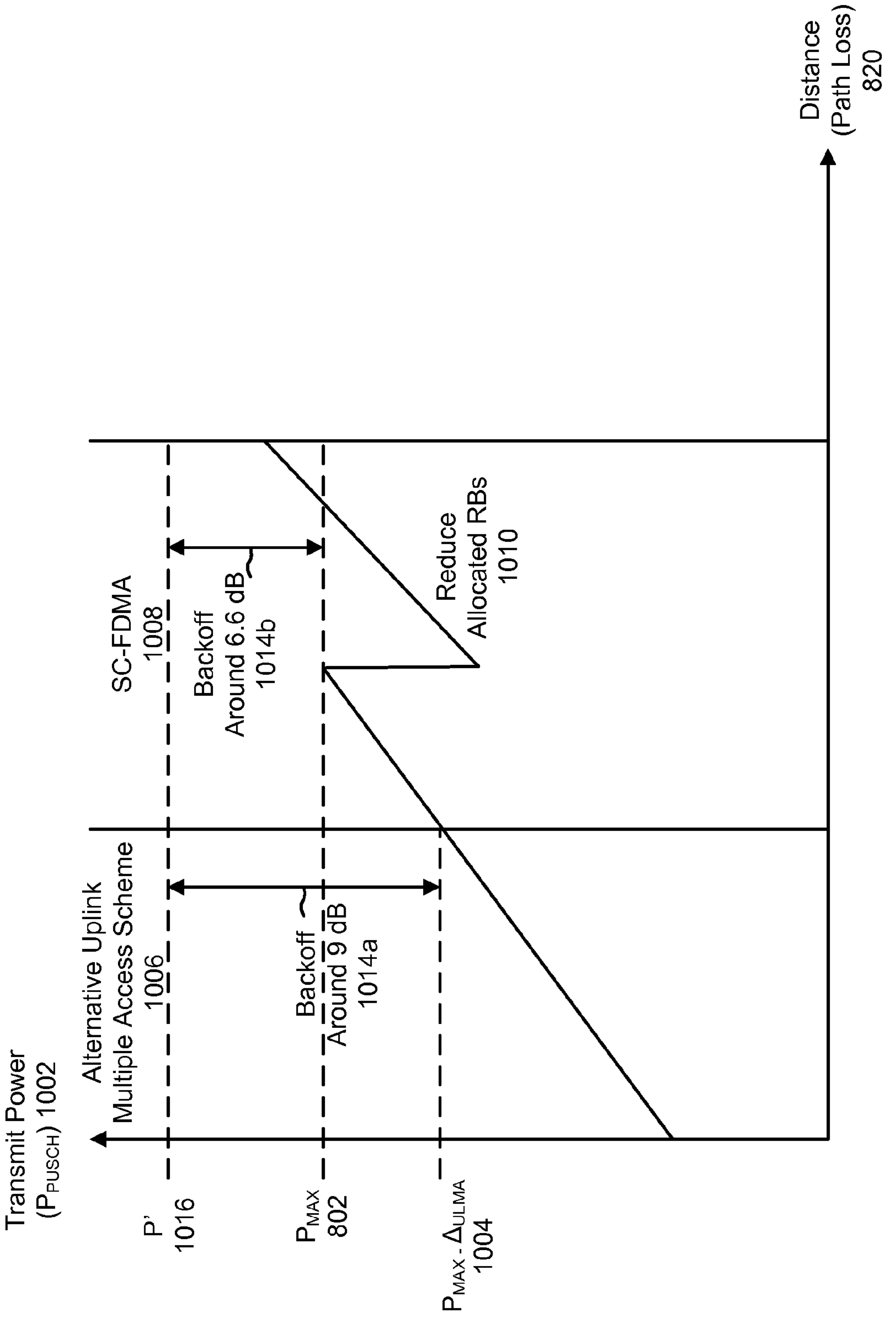
FIG. 10 illustrates an example of uplink power control in LTE-Advanced.

FIG. 10 illustrates an example of uplink power control in LTE-Advanced. A UE 304 may have a maximum transmission power P' 1016 that corresponds to the maximum input. In a real system, a power amplifier (PA) may not achieve a transmission power of P' because of the non-linear properties of PAs. An alternative uplink multiple access scheme 1006 may be used by the UE 304 when the UE 304 is nearby an eNodeB 302. For example, the UE 304 may use OFDMA, clustered SC-FDMA, or NxSC-FDMA as the alternative uplink multiple access scheme 1006. The UE 304 may use SC-FDMA 1008 as the uplink multiple access scheme when the UE 304 is on or near the cell edge. One difference between SC-FDMA 1008 and an alternative uplink multiple access scheme 1006 is the peak to average power ratio (PAPR)/cubic metric (CM). A higher PAPR/CM may result in a larger PA backoff 1014 and thus a lower maximum transmission power. SC-FDMA 1008 has a much lower PAPR/CM than the alternative uplink multiple access schemes 1006. Therefore, the maximum transmission power for SC-FDMA 1008 can be set to a higher value. In one configuration, the PA backoff 1014 may be 6.6 dB for a UE 304 using SC-FDMA 1008 as the uplink multiple access scheme and 9 dB for a UE 304 using an alternative uplink multiple access scheme 1006.

Because OFDMA, clustered SC-FDMA, and NxSC-FDMA have high PAPR/CM compared to SC-FDMA 1008, the maximum transmission power may not be set to a high value for these uplink multiple access schemes when compared to SC-FDMA 1008. For this reason, the operating point of the PA should depend on the uplink multiple access scheme.

In the figure, the maximum transmission power for the UE 304 using SC-FDMA 1008 as the uplink multiple access scheme may be $P_{MAX}$ 802. In contrast, the maximum transmission power for the UE 304 using an alternative uplink multiple access scheme 1006 may be $P_{MAX}-\Delta_{ULMA}$ 1004. A UE 304 using SC-FDMA 1008 as the uplink multiple access scheme may increase the maximum operating distance (path loss) 820 away from an eNodeB 302 by reducing 1010 the allocated RBs, thereby lowering the transmission power 1002.

Figure 11:
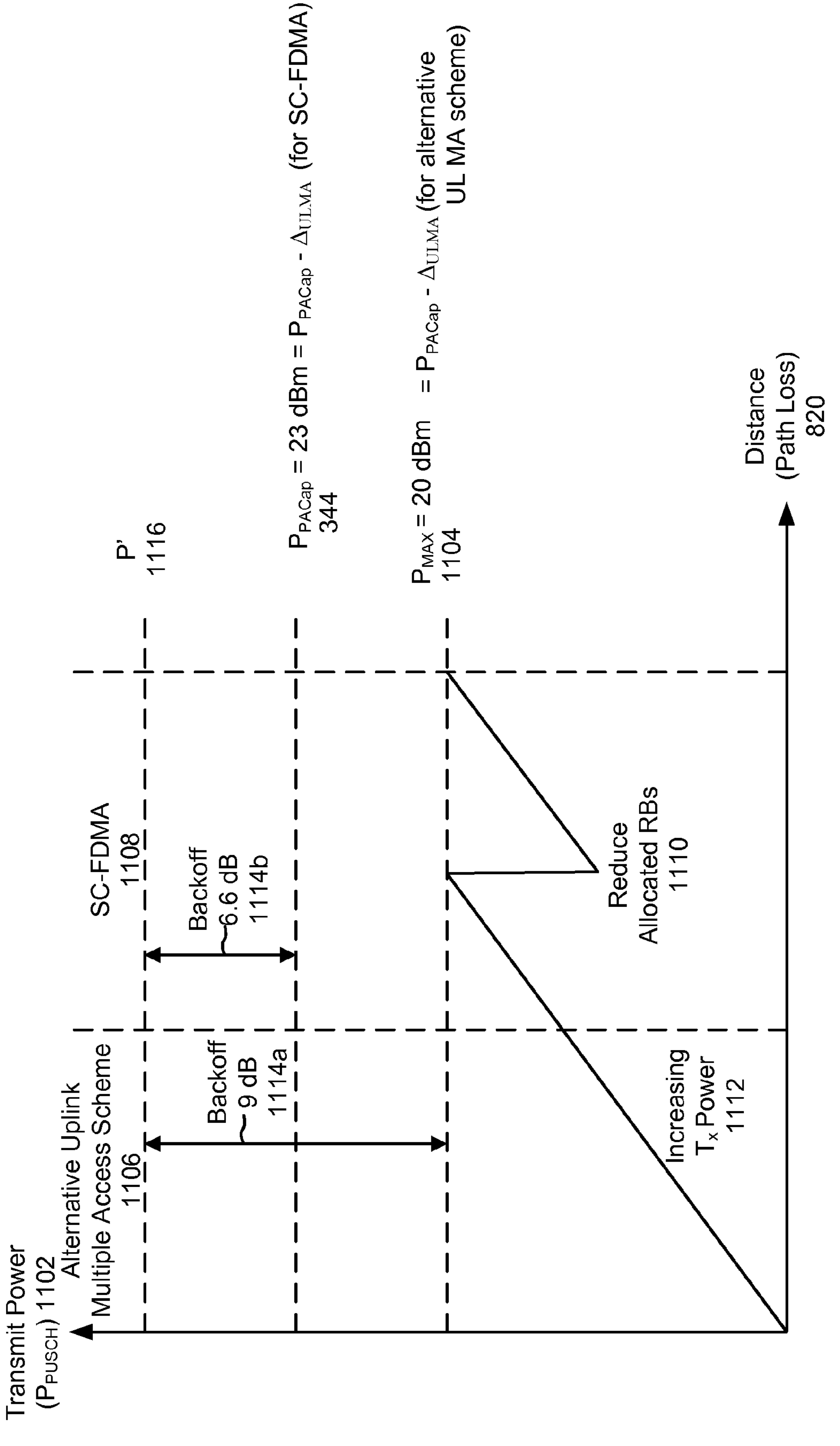
FIG. 11 illustrates an example of uplink power control in LTE-Advanced where the PA backoff is sufficient for both SC-FDMA and the alternative uplink multiple access schemes.

FIG. 11 illustrates an example of uplink power control in LTE-Advanced where the PA backoff 1114 is sufficient for both SC-FDMA 1108 and the alternative uplink multiple access schemes 1106. A UE 304 may have a maximum transmission power P' 1116 that corresponds to the maximum input, although a PA in a real system may be incapable of achieving a transmission power of P' because of the non-linear properties of a PA. The UE power class may be applied to the total transmission power from the UE 304. Thus, when the UE 304 has two transmission antennas, the maximum transmission power of each antenna may be 20 dBm.

The value of the power amplifier (PA) may be selected by the manufacturer of the UE 304. So, the UE 304 manufacturer may choose a high capacity PA which can support 23 dBm as the transmission power for one transmission antenna because of cost concerns. Therefore, the maximum transmission power may be limited by either $P_{MAX}$ 1104 or $P_{PACap}-\Delta_{ULMA}$. SO, the PUSCH transmit power 1102 may be calculated using Equation 3 above. The PUSCH transmit power 1102 may be calculated by the UE 304, the eNodeB 302, or both. For example, the UE 304 may report the PA capacity 344 to the eNodeB 302 and the eNodeB 302 may determine the maximum transmission power for the UE 304 based on the UE power class, the PA capacity 344, and the uplink multiple access scheme.

If it is assumed that the UE 304 has two transmit antennas and the PA capacity 344 for each antenna is 23 dBm, then the transmission power of each UE 304 antenna is reduced to 20 dBm to keep the total transmission power 1102 at 23 dBm. Likewise, if the UE 304 has four transmit antennas and the PA capacity 344 for each antenna is 23 dBm, the transmission power of each UE 304 antenna is reduced to 17 dBm to keep the total transmission power 1102 at 23 dBm. As with FIG. 10, a UE 304 using SC-FDMA 1108 as the uplink multiple access scheme may increase the maximum operating distance (path loss) 820 away from an eNodeB 302 by reducing 1110 the allocated RBs, thereby lowering the transmission power. In general, the transmission power of a UE 304 increases 1112 as the distance between the UE 304 and the eNodeB 302 increases.

Table 7 shows one example of $\min(P_{MAX}, P_{PACap}-\Delta_{ULMA})$. Min( . . . ) in Table 7 stands for $\min(P_{MAX}, P_{PACap}-\Delta_{ULMA})$. We assume that the UE 304 power class is 23 dBm. Thus, $P_{MAX}$ becomes 20 dBm for two transmit antennas and 17 dBm for four transmit antennas. It is also assumed that OFDMA is the alternative uplink multiple access scheme 1106 used. However, other alternative uplink multiple access schemes 1106 such as clustered SC-FDMA and NxSC-FDMA may be used with similar results. Because OFDMA is the alternative uplink multiple access scheme 1106 used, $\Delta_{ULMA}$ equals 2.4 dBm for Table 7.

TABLE 7

| PMAX | PPACap | PPACap-deltaULMA | Min ( . . . ) |
|---|---|---|---|
| 20 dBm | 23 dBm | 23 dBm<br>20.6 dBm | 20 dBm (for OFDMA and SC-FDMA) |
| 20 dBm | 20 dBm | 20 dBm<br>17.6 dBm | 20 dBm (for SC-FDMA)<br>17.6 dBm (for OFDMA) |
| 17 dBm | 23 dBm | 23 dBm<br>20.6 dBm | 17 dBm (for OFDMA and SC-FDMA) |
| 17 dBm | 17 dBm | 17 dBm<br>14.6 dBm | 17 dBm (for SC-FDMA)<br>14.6 dBm (for OFDMA) |

When $P_{MAX}$ 802 equals 20 dBm and $P_{PACap}$ 344 equals 23 dBm, the maximum transmission power can remain at 20 dBm regardless of the uplink multiple access scheme. On the other hand, if $P_{PACap}$ 344 equals 20 dBm, the maximum transmission power may depend on the uplink multiple access scheme. In the table, the maximum transmission power is 20 dBm for SC-FDMA 1108 and 17.6 dBm for OFDMA.

As another example, when $P_{MAX}$ 802 equals 17 dBm and $P_{PACap}$ 344 equals 23 dBm, the maximum transmission power can remain at 17 dBm regardless of the uplink multiple access scheme. However, if $P_{PACap}$ 344 equals 17 dBm, the maximum transmission power will depend on the uplink multiple access scheme. In the table, the maximum transmission power is 17 dBm for SC-FDMA 1108 and 14.6 dBm for OFDMA.

FIG. 12 shows several examples of RB allocations. FIGS. 12(*a*) and 12(*b*) are examples of RB allocations from Format 1' 312*c* and Format 2' 312*d* of the DCI 310. Format 1' 312*c* and Format 2' 312*d* may indicate RB allocations by the specific bit map 1204, 1206 as shown in FIG. 12(*a*) and FIG. 12(*b*). Because Format 1' 312*c* and Format 2' 312*d* may indicate multiple adjacent RBs as part of an RB allocation, Format 1' 312*c* and Format 2' 312*d* may indicate both contiguous RB and allocations and non-contiguous RB allocations.

FIG. 12(*c*) is an example of a contiguous RB allocation format, such as those in Format 1A' 312*a* and Format 1B' 312*b* of the DCI 310. In Format 1A' 312*a* and Format 1B' 312*b*, RB allocations may be indicated by a combination of a starting point 1208 and the number of RBs allocated, as shown in FIG. 12(*c*). So Format 1A' 312*a* and Format 1B' 312*b* may only indicate contiguous RB allocation.

Figure 12A:
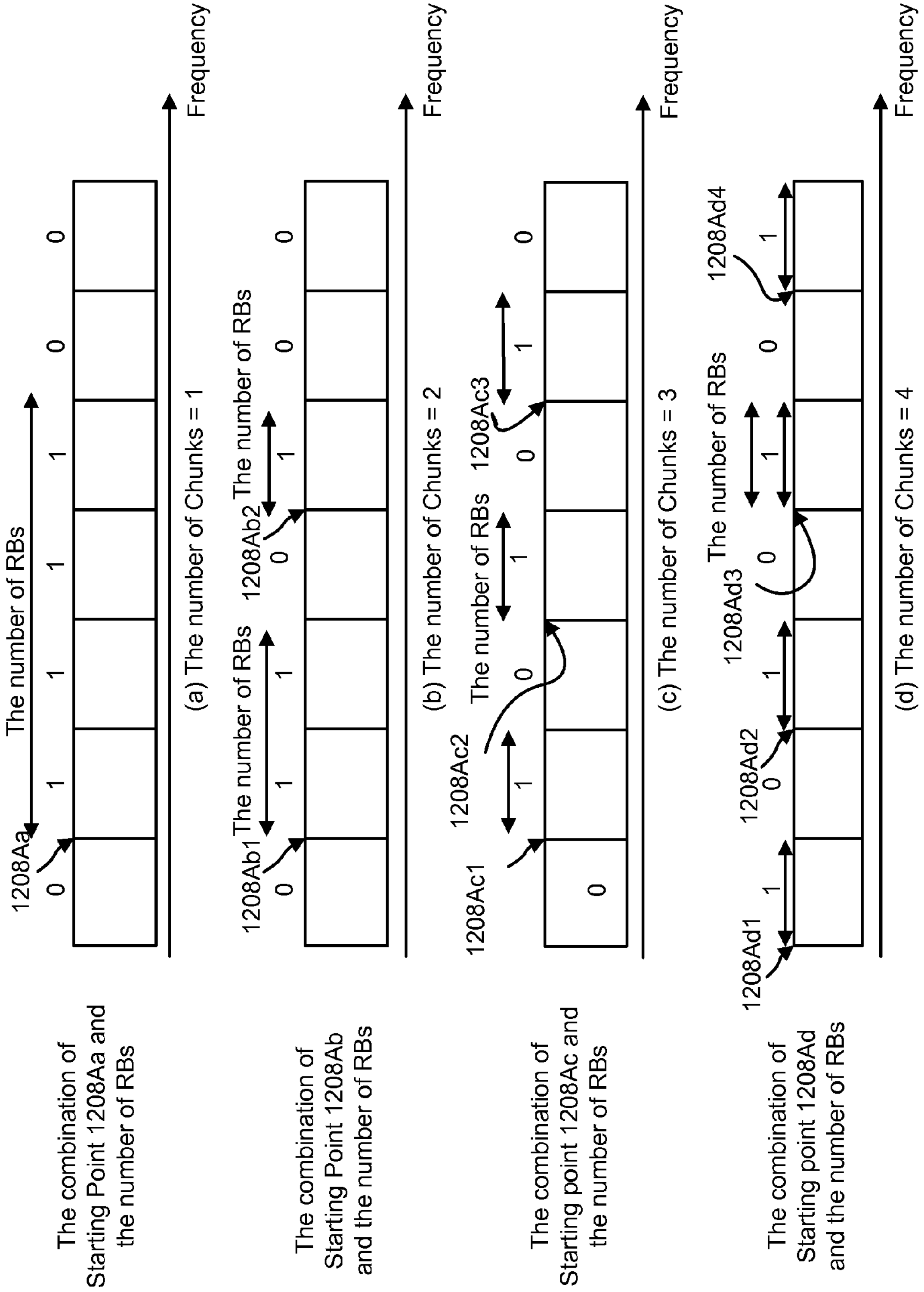
FIG. 12A shows several examples of RB allocations having various numbers of chunks.

FIG. 12A shows several examples of RB allocations having various numbers of chunks. Chunks were discussed above in relation to FIG. 6A. FIG. 12A(a) shows a case where the RB allocation has only one chunk. Here, the RB allocation may be indicated by a starting point 1208*a* and the number of RBs. FIG. 12A(b) shows a case where the RB allocation has two chunks. The RB allocation may be indicated by the starting point 1208*b* and the number of RBs. Alternatively, the RB allocation may be indicated by the bit maps.

FIG. 12A(c) shows a case where the RB allocation has three chunks. The RB allocation may again be indicated by the starting point 1208*c* and the number of RBs or alternatively by the bit maps for each RB. FIG. 12A(d) shows a case where the RB allocation has four chunks. The RB allocation may be indicated by the starting point 1208*d* and the number of RBs or by the bit maps for each RB.

Figure 13:
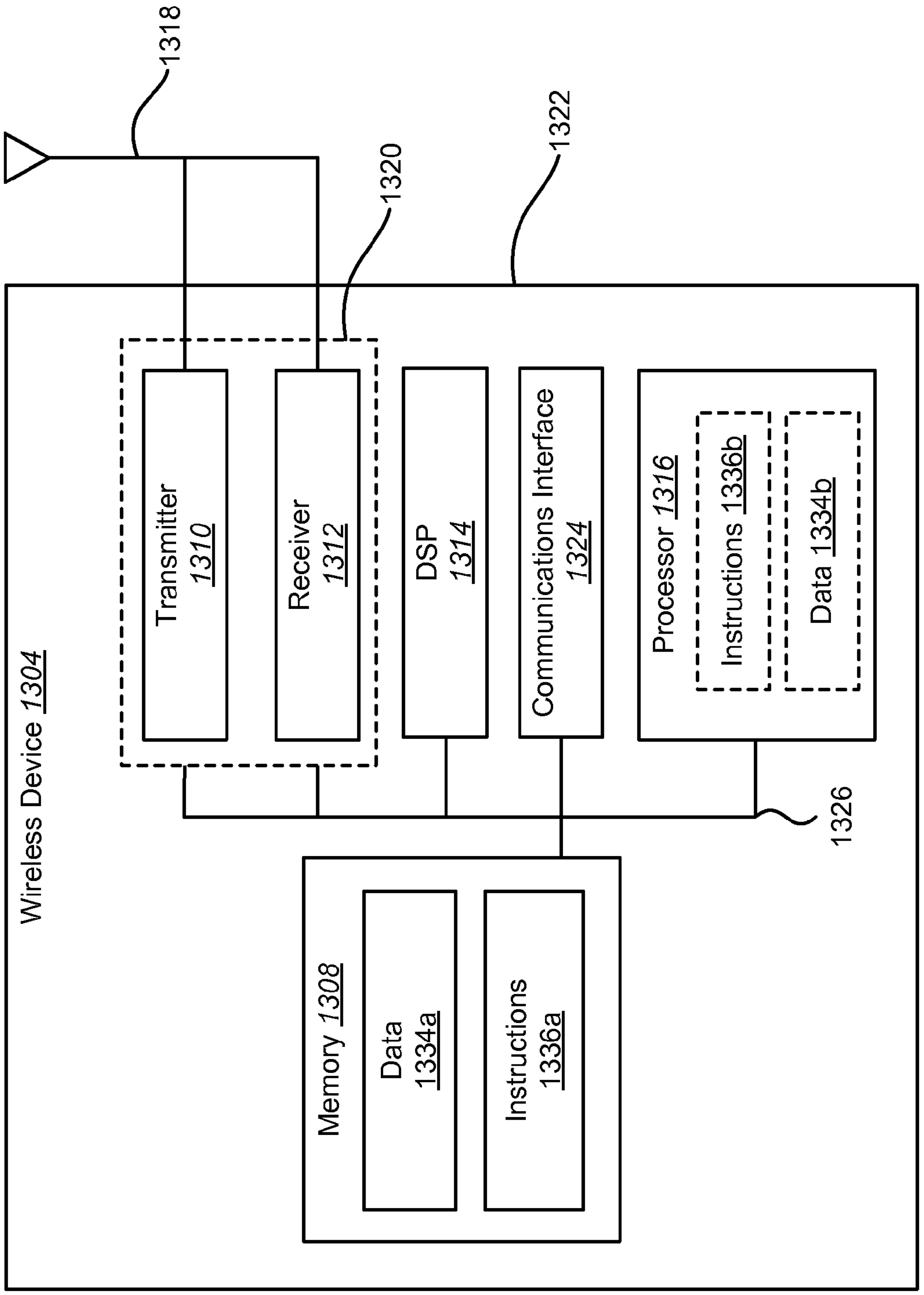
FIG. 13 is a block diagram of a wireless device in accordance with one configuration of the described systems and methods.

FIG. 13 is a block diagram of a wireless device 1304 in accordance with one configuration of the described systems and methods. The wireless device may be a UE, which may also be referred to as a mobile station, a subscriber station, an access terminal, a remote station, etc. The wireless device may also be a base station, which may also be referred to as an eNodeB, a base station controller, a base station transceiver, etc. The wireless device 1304 may include a transceiver 1320 that includes a transmitter 1310 and a receiver 1312. The transceiver 1320 may be coupled to one or more antennas 1318. The wireless device 1304 may further include a digital signal processor (DSP) 1314, a general purpose processor 1316, memory 1308, and a communications interface 1324. The various components of the wireless device 1304 may be included within a housing 1322.

The processor 1316 may control operation of the wireless device 1304. The processor 1316 may also be referred to as a CPU. The memory 1308, which may include both read-only memory (ROM) and random access memory (RAM), provides instructions 1336 and data 1334 to the processor 1316. A portion of the memory 1308 may also include non-volatile random access memory (NVRAM). The memory 1308 may include any electronic component capable of storing electronic information, and may be embodied as ROM, RAM, magnetic disk storage media, optical storage media, flash memory, on-board memory included with the processor 1316, EPROM memory, EEPROM memory, registers, a hard disk, a removable disk, a CD-ROM, etc.

The memory 1308 may store program instructions 1336 and other types of data 1334. The program instructions 1336 may be executed by the processor 1316 to implement some or all of the methods disclosed herein. The processor 1316 may also use the data 1334 stored in the memory 1308 to implement some or all of the methods disclosed herein. As a result, instructions and data 1334 may be loaded and/or otherwise used by the processor 1316.

In accordance with the disclosed systems and methods, the antenna may receive downlink signals that have been transmitted from a nearby communications device, such as an eNodeB 102, or uplink signals that have been transmitted from a nearby communications device, such as a UE 104. The antenna 1318 provides these received signals to the transceiver 1320 which filters and amplifies the signals. The signals are provided from the transceiver to the DSP 1314 and to the general purpose processor 1316 for demodulation, decoding, further filtering, etc.

The various components of the wireless device 1304 are coupled together by a bus system 1326 which may include a power bus, a control signal bus, and a status signal bus in addition to a data bus. However, for the sake of clarity, the various busses are illustrated in FIG. 13 as the bus system 1326.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure. For example, a reference to "base station 102" refers to the specific base station that is shown in FIG. 1. However, the use of "base station" without a reference number refers to any base station that is appropriate for the context in which the term is used, and is not limited to any particular base station shown in the Figures.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements. The terms "instructions" and "code" may be used interchangeably herein.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for uplink power control, the method comprising:

determining a user equipment (UE) power class;

determining an uplink multiple access scheme;

determining a maximum transmission power for the UE according to the determined uplink multiple access scheme and the UE power class; and determining a physical uplink shared channel (PUSCH) transmission power for the UE using the maximum transmission power.

2. The method of claim 1, further comprising determining a value for an uplink maximum transmission power limiting factor according to the determined uplink multiple access scheme, wherein the uplink maximum transmission power limiting factor is an uplink multiple access scheme dependent value used by the UE to limit the maximum transmission power for the UE.

3. The method of claim 2, wherein the maximum transmission power for the UE is a function of the UE power class and the uplink maximum transmission power limiting factor.

4. The method of claim 2, wherein the maximum transmission power for the UE is a function of the UE power class, the uplink maximum transmission power limiting factor, and a power amplification (PA) capacity for each power amplifier of the UE.

5. The method of claim 2, wherein the value of the uplink maximum transmission power limiting factor is 1.6 for clustered single carrier frequency division multiple access (Clustered SC-FDMA).

6. The method of claim 2, wherein the value of the uplink maximum transmission power limiting factor is 2.0 for N (N is a natural number) times single carrier frequency division multiple access (N×SC-FDMA).

7. The method of claim 2, wherein the value of the uplink maximum transmission power limiting factor is 2.4 for orthogonal frequency division multiple access (OFDMA).

8. The method of claim 2, wherein the value of the uplink maximum transmission power limiting factor is 0 for single carrier frequency division multiple access (SC-FDMA).

9. The method of claim 2, wherein the value of the uplink maximum transmission power limiting factor is less than 4 dB.

10. The method of claim 1, further comprising transmitting uplink signals according to the uplink multiple access scheme using the PUSCH transmission power.

11. The method of claim 1, wherein the uplink multiple access scheme is single carrier frequency division multiple access (SC-FDMA).

12. The method of claim 1, wherein the uplink multiple access scheme is orthogonal frequency division multiple access (OFDMA).

13. The method of claim 1, wherein the uplink multiple access scheme is N (N is a natural number) times single carrier frequency division multiple access (N×SC-FDMA).

14. The method of claim 1, wherein the uplink multiple access scheme is clustered single carrier frequency division multiple access (Clustered SC-FDMA).

15. The method of claim 1, further comprising:

receiving downlink control information (DCI); and decoding a format of the DCI, wherein the uplink multiple access scheme is determined according to the format of the DCI.

16. The method of claim 15, wherein decoding the format of the DCI comprises determining if the format of the DCI includes a resource block (RB) allocation format that only allows contiguous RB allocation.

17. The method of claim 16, wherein decoding the format of the DCI further comprises determining if the format of the DCI includes a precoding matrix index (PMI).

18. The method of claim 15, wherein decoding the format of the DCI comprises determining if the format of the DCI includes a non-contiguous resource block (RB) allocation.

19. The method of claim 15, further comprising sending the power amplifier (PA) capacity to an eNodeB, wherein the PA capacity is an internal parameter for each UE that defines a total transmission power of the UE.

20. The method of claim 1, wherein the UE is configured for operation in a 3GPP LTE-Advanced system, wherein the uplink multiple access scheme is one of orthogonal frequency division multiple access (OFDMA), clustered single carrier frequency division multiple access (Clustered SC-FDMA), and N (N is a natural number) times single carrier frequency division multiple access (N×SC-FDMA) if the format of the DCI includes a precoding matrix index (PMI) and/or a non-contiguous resource block (RB) allocation format, and wherein the uplink multiple access scheme is single carrier frequency division multiple access (SC-FDMA) if the format of the DCI does not include a PMI or a non-contiguous RB allocation format.

21. The method of claim 1, wherein the UE is configured for operation in a 3GPP LTE-Advanced system, wherein the uplink multiple access scheme is one of orthogonal frequency division multiple access (OFDMA), clustered single carrier frequency division multiple access (Clustered SC-FDMA) and N (N is a natural number) times single carrier frequency division multiple access (N×SC-FDMA) if the format of the DCI includes a non-contiguous resource block (RB) allocation, and wherein the uplink multiple access scheme is single carrier frequency division multiple access (SC-FDMA) if the format of the DCI includes a contiguous RB allocation.

22. The method of claim 1, wherein determining the uplink multiple access scheme comprises comparing the format of the DCI to an uplink data transmission table.

23. The method of claim 1, wherein the method is carried out by a UE using L1/L2 signaling.

24. A user equipment (UE) that is configured for uplink power control, the UE comprising:
- a processor;
- memory in electronic communication with the processor;
- instructions stored in the memory, the instructions being executable to:
  - determine a UE power class;
  - determine an uplink multiple access scheme;
  - determine a maximum transmission power for the UE according to the determined uplink multiple access scheme and the UE power class; and
  - determine a physical uplink shared channel (PUSCH) transmission power for the UE using the maximum transmission power.

25. The UE of claim 24, wherein the instructions are further executable to determine a value for an uplink maximum transmission power limiting factor according to the determined uplink multiple access scheme, wherein the uplink maximum transmission power limiting factor is an uplink multiple access scheme dependent value used by the UE to limit the maximum transmission power for the UE.

26. The UE of claim 25, wherein the maximum transmission power for the UE is a function of the UE power class and the uplink maximum transmission power limiting factor.

27. The UE of claim 25, wherein the maximum transmission power for the UE is a function of the UE power class, the uplink maximum transmission power limiting factor, and a power amplification capacity for each power amplifier of the UE.

28. The UE of claim 25, wherein the value of the uplink maximum transmission power limiting factor is 1.6 for clustered single carrier frequency division multiple access (Clustered SC-FDMA).

29. The UE of claim 25, wherein the value of the uplink maximum transmission power limiting factor is 2.0 for N (N is a natural number) times single carrier frequency division multiple access (N×SC-FDMA).

30. The UE of claim 25, wherein the value of the uplink maximum transmission power limiting factor is 2.4 for orthogonal frequency division multiple access (OFDMA).

31. The UE of claim 25, wherein the value of the uplink maximum transmission power limiting factor is 0 for single carrier frequency division multiple access (SC-FDMA).

32. The UE of claim 25, wherein the value of the uplink maximum transmission power limiting factor is less than 4 dB.

33. The UE of claim 24, wherein the instructions are further executable to transmit uplink signals according to the uplink multiple access scheme using the determined PUSCH transmission power.

34. The UE of claim 24, wherein the uplink multiple access scheme is single carrier frequency division multiple access (SC-FDMA).

35. The UE of claim 24, wherein the uplink multiple access scheme is orthogonal frequency division multiple access (OFDMA).

36. The UE of claim 24, wherein the uplink multiple access scheme is N (N is a natural number) times single carrier frequency division multiple access (N×SC-FDMA).

37. The UE of claim 24, wherein the uplink multiple access scheme is clustered single carrier frequency division multiple access (Clustered SC-FDMA).

38. The UE of claim 24, wherein the instructions are further executable to:
- receive downlink control information (DCI); and
- decode a format of the DCI, wherein the uplink multiple access scheme is determined according to the format of the DCI.

39. The UE of claim 38, wherein decoding the format of the DCI comprises determining if the format of the DCI includes a resource block (RB) allocation format that only allows contiguous RB allocation.

40. The UE of claim 38, wherein decoding the format of the DCI further comprises determining if the format of the DCI includes a precoding matrix index (PMI).

41. The UE of claim 24, wherein the UE is configured for operation in a 3GPP LTE-Advanced system, wherein the uplink multiple access scheme is orthogonal frequency division multiple access (OFDMA), clustered single carrier frequency division multiple access (Clustered SC-FDMA), and N (N is a natural number) times single carrier frequency division multiple access (N×SC-FDMA) if the format of the DCI includes a precoding matrix index (PMI) and/or a non-contiguous resource block (RB) allocation format, and wherein the uplink multiple access scheme is single carrier frequency division multiple access (SC-FDMA) if the format of the DCI does not include a PMI or a non-contiguous RB allocation format.

42. The UE of claim 24, wherein the UE is configured for operation in a 3GPP LTE-Advanced system, wherein the uplink multiple access scheme is orthogonal frequency division multiple access (OFDMA), clustered single carrier frequency division multiple access (Clustered SC-FDMA) and N (N is a natural number) times single carrier frequency division multiple access (N×SC-FDMA) if the format of the DCI includes a non-contiguous resource block (RB) allocation, and wherein the uplink multiple access scheme is single carrier frequency division multiple access (SC-FDMA) if the format of the DCI includes a contiguous RB allocation.

43. The UE of claim 24, wherein determining the uplink multiple access scheme comprises comparing the format of the DCI to an uplink data transmission table.

44. The UE of claim 24, wherein the instructions are further executable to report the power amplification (PA) capacity for the UE to a base station, wherein the PA capacity is an internal parameter for each UE that defines a total transmission power of the UE.

45. A base station that is configured for uplink power control in a wireless communications system, the base station comprising:

a processor;

memory in electronic communication with the processor;

instructions stored in the memory, the instructions being executable to:

determine a location of a user equipment (UE);

determine a UE power class;

determine an uplink multiple access scheme to be used by the UE;

select a format for downlink control information (DCI), wherein the format of the DCI corresponds to at least one of the uplink multiple access scheme and an uplink maximum transmission power limiting factor; and transmit the DCI to the UE.

46. The base station of claim 45, wherein the base station is configured for operation in a 3GPP LTE-Advanced system.

47. The base station of claim 45, wherein the format of the DCI is selected based on a transmission mode of the UE.

48. The base station of claim 45, wherein the format of the DCI is selected based on the location of the UE.

49. The base station of claim 45, wherein the instructions are further executable to transmit the DCI to the UE using L1/L2 signaling.

50. A non-transitory computer-readable medium comprising executable instructions for:

determining a user equipment (UE) power class;

determining an uplink multiple access scheme;

determining a maximum transmission power for the UE according to the determined uplink multiple access scheme and the UE power class; and determining a physical uplink shared channel (PUSCH) transmission power for the UE using the maximum transmission power.

51. A method for uplink power control, the method comprising:

receiving a downlink control indicator (DCI);

determining a number of chunks of resource blocks (RBs) in the DCI;

determining a value for an uplink maximum transmission power limiting factor according to the number of chunks of RBs, wherein the uplink maximum transmission power limiting factor is an uplink multiple access scheme dependent value used by a UE to limit a maximum transmission power for the UE;

determining an uplink multiple access scheme; and determining the maximum transmission power for the UE according to the determined uplink multiple access scheme and the uplink maximum transmission power limiting factor.

52. A method for uplink power control, the method being implemented by a user equipment (UE), the method comprising:

receiving downlink control information (DCI);

decoding the DCI which includes the uplink resource allocation; and determining a value for an uplink maximum transmission power limiting factor by whether the resource allocation indicates SC-FDMA or clustered SC-FDMA, wherein the uplink maximum transmission power limiting factor is used to limit the maximum transmission power for the UE.

53. A user equipment (UE) that is configured for uplink power control, the UE comprising:

a processor;

memory in electronic communication with the processor;

instructions stored in the memory, the instructions being executable to:

receive downlink control information (DCI);

decode the DCI which includes the uplink resource allocation; and determine a value for an uplink maximum transmission power limiting factor by whether the resource allocation indicates SC-FDMA or clustered SC-FDMA, wherein the uplink maximum transmission power limiting factor is used to limit the maximum transmission power for the UE.

54. A processor that is configured for uplink power control, the processor being included in a user equipment (UE), the processor comprising:

memory;

instructions stored in the memory, the instructions being executable to:

receive downlink control information (DCI);

decode the DCI which includes the uplink resource allocation; and determine a value for an uplink maximum transmission power limiting factor by whether the resource allocation indicates SC-FDMA or clustered SC-FDMA, wherein the uplink maximum transmission power limiting factor is used to limit the maximum transmission power for the UE.

55. A method for uplink power control, the method being implemented by a user equipment (UE), the method comprising:

receiving downlink control information (DCI);

decoding the DCI which includes an uplink resource allocation; and determining a value of an uplink maximum transmission power limiting factor by determining whether the uplink resource allocation is contiguously allocated or not, wherein the uplink maximum transmission power limiting factor is used to limit a maximum transmission power for the UE.

56. The method of claim 55, wherein the uplink resource allocation indicates either a single starting point for contiguous resource allocation or two starting points for non-contiguous resource allocation.

57. A method for uplink power control, the method being implemented by a user equipment (UE), the method comprising:

receiving downlink control information (DCI); and decoding the DCI which includes an uplink resource allocation, wherein the received DCI includes one bit of information which indicates either type 0 or type 1 as a type of the uplink resource allocation.

58. A method for uplink power control, the method being implemented by a base station, the method comprising:

determining a type of an uplink resource allocation; and transmitting downlink control information that includes one bit of information which indicates either type 0 or type 1 as a type of the uplink resource allocation.

59. A user equipment (UE) that is configured for uplink power control, the UE comprising:

a processor;

memory in electronic communication with the processor;

instructions stored in the memory, the instructions being executable to:

receive downlink control information (DCI);

decode the DCI which includes an uplink resource allocation; and determine a value of an uplink maximum transmission power limiting factor by determining whether the uplink resource allocation is contiguously allocated or not, wherein the uplink maximum transmission power limiting factor is used to limit a maximum transmission power for the UE.

60. The UE of claim 59, wherein the uplink resource allocation indicates either a single starting point for contiguous resource allocation or two starting points for non-contiguous resource allocation.

61. A user equipment (UE) that is configured for uplink power control, the UE comprising:

a processor;

memory in electronic communication with the processor;

instructions stored in the memory, the instructions being executable to:

receive downlink control information (DCI); and decode the DCI which includes an uplink resource allocation, wherein the received DCI includes one bit of information which indicates either type 0 or type 1 as a type of the uplink resource allocation.

62. A base station that is configured for uplink power control, the base station comprising:

a processor;

memory in electronic communication with the processor; and instructions stored in the memory, the instructions being executable to:

determine a type of an uplink resource allocation; and transmit downlink control information that includes one bit of information which indicates either type 0 or type 1 as a type of the uplink resource allocation.

63. A processor that is configured for uplink power control, the processor being included in a user equipment (UE), the processor comprising:

memory;

instructions stored in the memory, the instructions being executable to:

receive downlink control information (DCI);

decode the DCI which includes an uplink resource allocation; and determine a value of an uplink maximum transmission power limiting factor by determining whether the uplink resource allocation is contiguously allocated or not, wherein the uplink maximum transmission power limiting factor is used to limit a maximum transmission power for the UE.

64. The processor of claim 63, wherein the uplink resource allocation indicates either a single starting point for contiguous resource allocation or two starting points for non-contiguous resource allocation.

65. A processor that is configured for uplink power control, the processor being included in a user equipment (UE), the processor comprising:

memory;

instructions stored in the memory, the instructions being executable to:

receive downlink control information (DCI); and decode the DCI which includes an uplink resource allocation, wherein the received DCI includes one bit of information which indicates either type 0 or type 1 as a type of the uplink resource allocation.

66. A processor that is configured for uplink power control, the processor being included in a base station, the processor comprising:

memory;

instructions stored in the memory, the instructions being executable to:

determine a type of an uplink resource allocation; and transmit downlink control information that includes one bit of information which indicates either type 0 or type 1 as a type of the uplink resource allocation.

* * * * *

UNITED STATES PATENT AND TRADEMARK OFFICE

CERTIFICATE OF CORRECTION

PATENT NO. : 8,379,581 B2
APPLICATION NO. : 12/330313
DATED : February 19, 2013
INVENTOR(S) : Kimihiko Imamura It is certified that error appears in the above-identified patent and that said Letters Patent is hereby corrected as shown below:

In the Specification

In column 22, line 13 please delete "instructions and" and replace it with --instructions 1336 and--.

In column 22, line 16 please delete "antenna may" and replace it with --antenna 1318 may--.

Signed and Sealed this
Nineteenth Day of November, 2013

Teresa Stanek Rea
*Deputy Director of the United States Patent and Trademark Office*